United States Patent
Inoue

(10) Patent No.: US 11,470,217 B2
(45) Date of Patent: Oct. 11, 2022

(54) SERVICE PROVIDING SYSTEM WITH CONTROLLED DISPLAY, INFORMATION PROCESSING SYSTEM, DISPLAY CONTROL METHOD, AND NON-TRANSITORY RECORDING MEDIUM

(71) Applicant: Keiichi Inoue, Kanagawa (JP)

(72) Inventor: Keiichi Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/471,196

(22) Filed: Sep. 10, 2021

(65) Prior Publication Data

US 2022/0094806 A1    Mar. 24, 2022

(30) Foreign Application Priority Data

Sep. 24, 2020 (JP) .............................. JP2020-159546

(51) Int. Cl.
  H04N 1/00 (2006.01)
(52) U.S. Cl.
  CPC ..... *H04N 1/00938* (2013.01); *H04N 1/00427* (2013.01); *H04N 1/00503* (2013.01)
(58) Field of Classification Search
  CPC ........... H04N 1/00938; H04N 1/00405–00517
  See application file for complete search history.

(56) References Cited

U.S. PATENT DOCUMENTS

| 2018/0013913 | A1 | 1/2018 | Hayashi et al. |
| 2018/0068345 | A1* | 3/2018 | Hirokawa .......... H04N 1/00941 |
| 2020/0267270 | A1* | 8/2020 | Mori .................... H04N 1/4406 |

FOREIGN PATENT DOCUMENTS

| JP | 2017-084402 | 5/2017 |
| JP | 2018-014079 | 1/2018 |
| JP | 2018-046551 | 3/2018 |

* cited by examiner

*Primary Examiner* — Nicholas Pachol
(74) *Attorney, Agent, or Firm* — Xsensus LLP

(57) ABSTRACT

A service providing system, an information processing system, a display control method, and a non-transitory recording medium. The service providing system stores in one or more memories, application settings information indicating settings of one or more setting items for each application, sets a setting item to be displayed on a setting screen for setting application to non-display, and in response to determination that the setting item set to non-display is included in the one or more setting items of the application settings information, switch a display setting of the setting item from non-display to display, to cause the setting item to be displayed on the setting screen.

10 Claims, 25 Drawing Sheets

FIG. 6

| APPLICATION ID | APPLICATION NAME | COMPONENT ID | APPLICATION PROCESSING INFORMATION |
|---|---|---|---|
| 10000 | WORKFLOW A | CA01 (OCR), CB01 (FILE UPLOAD) | ... |
| 11001 | WORKFLOW B | CA02 (PDF OPERATION), CB02 (EMAIL TRANSMISSION) | ... |
| 11002 | WORKFLOW C | CA03 (IMAGE CONVERSION), CB03 (PRINT) | ... |
| ... | ... | ... | ... |

FIG. 7

```
[
    {
        "data_id":1,
        "data_key":"storage_filename",
        "format":"input_text",
        "data_source":null
    },
    {
        "data_id":2,
        "data_key":"storage_targetfolder",
        "format":"select",
        "data_source":http://sample.ricoh.xxx/service-a/folders
    }
]
```

FIG. 8

```
[
  {
    "data_id":1,
    "display_name":"FILE NAME",
    "layout":{
      "order":1
    }
  },
  {
    "data_id":2,
    "display_name":"DESTINATION",
    "layout":{
      "order":2
    }
  }
]
```

FIG. 9

```
From("file:input")
.to("process:ocr")
.to("storage:send_to_folder?type=service-a&target=samplefolder")
```

FIG. 10

| APPLICATION ID | COMPONENT ID | SETTINGS INFORMATION |
|---|---|---|
| 10000 | CA01 | { "operation":"ocr", "parameters":{ "language":["Japanese", "Chinese", "Thai"] } } |
| 10001 | CB02 | { "operation":"sendMail", "parameters":["to", "cc"] } |
| ... | ... | ... |

| APPLICATION ID | SETTINGS INFORMATION | REQUESTER'S EMAIL ADDRESS |
|---|---|---|
| 10000 | {<br>"operation":"ocr",<br>"parameters":{<br>"language":"Thai"<br>}<br>} | ricoh.taro@xxx.com |
| 10001,11122,13456 | {<br>"operation":"sendMail",<br>"parameters":"cc"<br>} | icoh.hanako@xxx.com |
| ... | ... | ... |

FIG. 16

```
{
    "applicationId":"10000",
    "flowDetails":[
        {
            "operation":"ocr",
            "parameters":{
                "language" ["Japanese","Chinese","Thai"],
                "outputType":"pdf"
            }
        },
        {
            "operation":"uploadFile",
            "parameters":{
                "folderId":""
            }
        }
    ]
}
```

FIG. 22

```
{
    "applicationId":"10000",
    "flowDetails":[
        {
            "operation":"ocr",
            "parameters":{

"language" ["Japanese","Chinese","Thaiver2.0"],
                "outputType":"pdf"
            }
        },
        {
            "operation":"uploadFile",
            "parameters":{
                "folderId":""
            }
        }
    ]
}
```

SERVICE PROVIDING SYSTEM WITH CONTROLLED DISPLAY, INFORMATION PROCESSING SYSTEM, DISPLAY CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-159546, filed on Sep. 24, 2020, in the Japan Patent Office, the entire disclosure of which is hereby incorporated by reference herein.

BACKGROUND

Technical Field

The present disclosure relates to a service providing system, an information processing system, a display control method, and a non-transitory recording medium.

Related Art

In recent years, services that provide a plurality of functions (for example, scan, print, email transmission, etc.) have become known. For example, in a known service, an electronic file (image file) generated by scanning is processed in a certain way and then delivered by an email. Such service is implemented by executing one or more processes that together implement each function, as a series of processes.

In addition, since the services that users want to use are diversifying, it is necessary to develop applications that can implement services that meet individual needs. In a known system that supports development of the application, settings for each function can be made easily even for an application developer who does not have specialized knowledge or experience regarding a programming language or the like.

SUMMARY

Embodiments of the present disclosure describe a service providing system, an information processing system, a display control method, and a non-transitory recording medium. The service providing system stores in one or more memories, application settings information indicating settings of one or more setting items for each application, sets a setting item to be displayed on a setting screen for setting application to non-display, and in response to determination that the setting item set to non-display is included in the one or more setting items of the application settings information, switch a display setting of the setting item from non-display to display, to cause the setting item to be displayed on the setting screen.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a conceptual diagram illustrating an example of an application information management table;

FIG. 7 is a conceptual diagram illustrating an example of a data definition;

FIG. 8 is a conceptual diagram illustrating an example of layout information;

FIG. 9 is a conceptual diagram illustrating an example of processing flow information;

FIG. 10 is a conceptual diagram illustrating an example of an application settings management table;

FIG. 16 is a conceptual diagram illustrating an example of registration information transmitted from the communication terminal;

FIG. 22 is a conceptual diagram illustrating an example of update information transmitted from the communication terminal;

Figure 1:
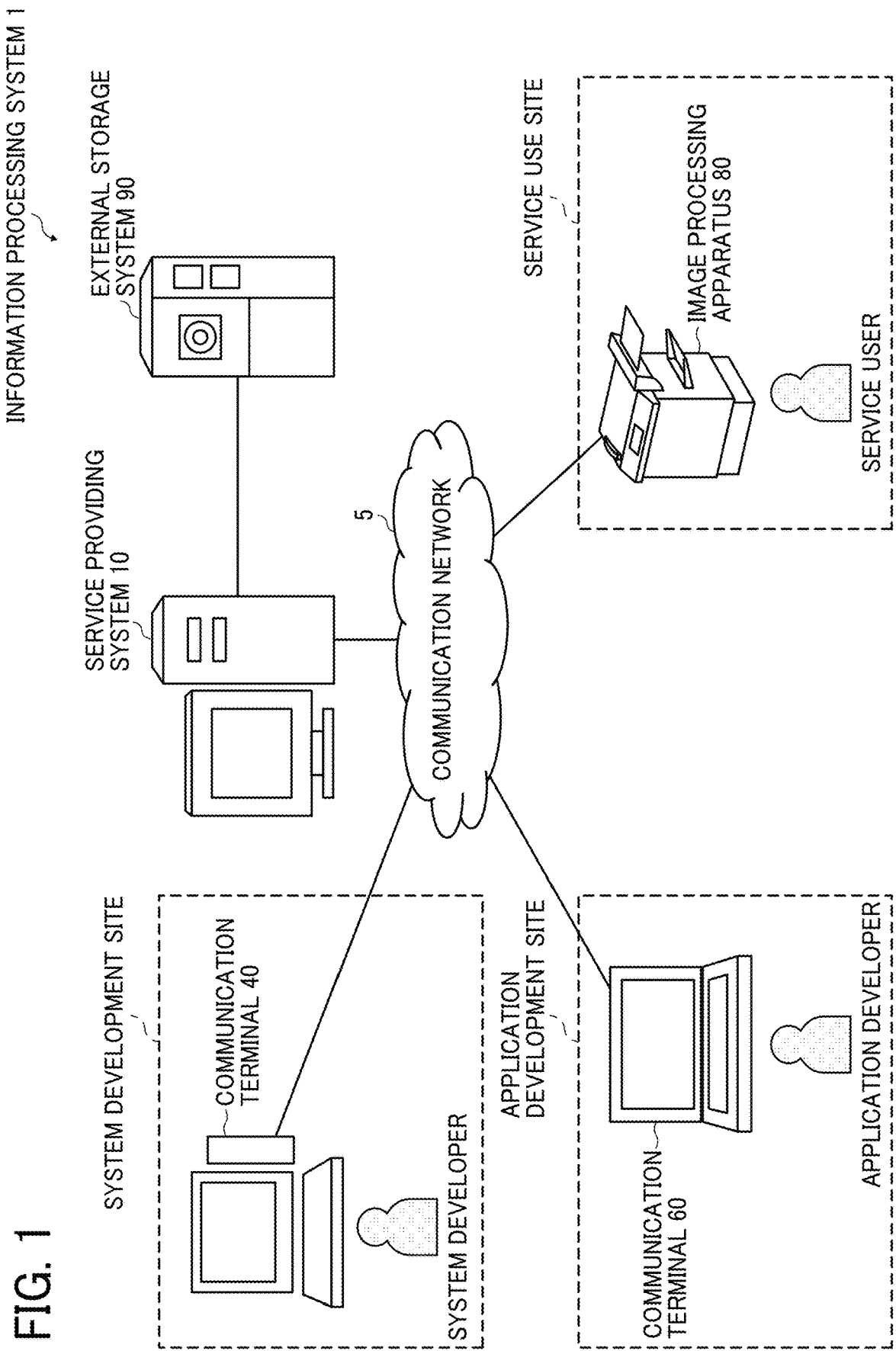
FIG. 1 is a diagram illustrating an example of an overall configuration of an information processing system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, same elements are denoted by the same reference numerals, and redundant description is omitted.

FIG. 1 is a diagram illustrating an example of an overall configuration of an information processing system. In the information processing system 1 illustrated in FIG. 1, an application developer creates or updates an application that executes a service provided by a service providing system 10.

The information processing system 1 includes a service providing system 10, a communication terminal 40 (an example of a second communication terminal), a communication terminal 60 (an example of a first communication terminal), an image processing apparatus 80, and an external storage system 90. The service providing system 10, the communication terminal 40, the communication terminal 60, and the image processing apparatus 80 included in the information processing system 1 communicate with each other through the communication network 5. The communication network 5 is implemented by the internet, a mobile communication network, a local area network (LAN), etc. The communication network 5 includes not only wired communication but also networks by wireless communication such as 3rd generation (3G), 4th generation (4G), 5th generation (5G), Wireless Fidelity (registered trademark) (Wi-Fi), Worldwide Interoperability for Microwave Access (WiMAX) or Long Term Evolution (LTE). Further, the service providing system 10, the communication terminal 40, the communication terminal 60, and the image processing apparatus 80 may be provided with a communication function by a short-range communication technology such as Near Field Communication (NFC).

The service providing system 10 provides various services through the communication network 5. The service providing system 10 provides, for example, a scan distribution service in which an electronic file generated by scanning a document with the image processing apparatus 80 at a service use site is processed by an optical character reader (OCR) and stored in the external storage system 90. Further, the service providing system 10 provides, for example, a cloud print service for printing an electronic file stored in the external storage system 90 by the image processing apparatus 80 at the service use site.

The service provided by the service providing system 10 is not limited to the above description, and may be, for example, a service of projecting an electronic file stored in the external storage system 90 with a projector installed at the service use site, or a service of translating contents in an electronic file generated by scanning a document in the image processing apparatus 80 into a certain language (for example, from English to Japanese) after OCR processing and saves the file having the translated contents in the external storage system 90. Further, in the present embodiment, the service providing system 10 provides the cloud service as described above, but the service providing system 10 may provide, for example, various services such as a service or a web service provided by an application service provider (ASP) through the communication network 5.

The service providing system 10 includes a workflow application that provides various services implemented by a series of processes that combine one or more processes among a plurality of processes that implements various functions. Here, the function is processing performed in relation to the electronic file such as the document file or an image file. More specifically, such functions include, for example, printing, scanning, facsimile transmission, data format conversion, email distribution, OCR processing, editing, compression, decompression, or storing in a repository.

Figure 2:
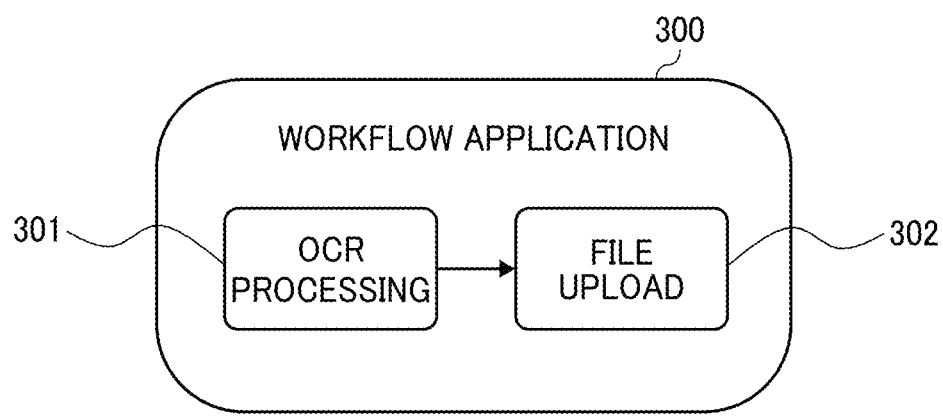
FIG. 2 is a diagram illustrating an example of a workflow application.

An outline of the workflow application is described with reference to FIG. 2. FIG. 2 is a diagram illustrating an example of the workflow application. The workflow application is, for example, an application configured by combining a plurality of components (functions) so that a service process can be performed according to a flow desired by a user. The workflow application is not always made up of in-house components but may also be developed in combination with components produced by a third party such as a development partner. Accordingly, even in one application, not all set values (specifications) of the individual components included in the application match with one another. Therefore, in order to manage the workflow application, it is necessary to have information on the set value for each component included in the application.

The workflow application 300 illustrated in FIG. 2 includes a combination of an OCR processing component 301 and a file upload component 302. The number of components included in the workflow application 300 is not limited to two and may be appropriately set according to the flow desired by the user. Hereinafter, the workflow application is referred to as an application.

Returning to FIG. 1, the external storage system 90 provides the image processing apparatus 80 with a cloud service called a storage service (or an online storage). The storage service is a service that rents out a storage area in the external storage system 90. The external storage system 90 stores (uploads) an OCR-processed electronic file in the storage area in the external storage system 90 that is rented, for example, through the scan distribution service. Further, the external storage system 90 acquires (downloads) an electronic file to be printed from the storage area in the external storage system 90 that is rented, for example, through the cloud print service.

The service providing system 10 and the external storage system 90 may be implemented by a single computer or may be implemented by a plurality of computers each allocated to each part (function) of each device that is divided. The service providing system 10 and the external storage system 90 may be, for example, a single computer that performs all or a part of each function having been integrated. Further, all or a part of the functions of the service providing system 10 may be implemented by a server computer residing in the cloud environment or a server computer residing in an on-premises environment.

The communication terminal 40 is a computer such as a personal computer (PC) used by the system developer of the service providing system 10. The system developer designs an application development tool provided by the service providing system 10 by using the communication terminal 40 at a system development site. The application development tool is software for developing the workflow application. The application development tool enables to select a function from a plurality of functions and register and execute a series of processes connecting the functions as a flow.

The communication terminal 60 is a computer such as a PC used by the application developer who develops the application for providing a service from the service providing system 10. The application developer develops the application by using the application development tool provided by the service providing system 10 at the application development site. The communication terminal 40 and the communication terminal 60 are not limited to PCs, and may be, for example, terminals such as tablet terminals, smartphones, and wearable terminals.

The application developer implements a desired operation by combining a plurality of functions and selecting settings parameters associated with the functions by using the application development tool. On the other hand, while the system developer may want to improve existing functions, if the system developer makes improvements unnecessarily, the operation of existing applications developed using those functions may be affected. For example, in a workflow application that processes multiple functions in sequence, assume there is an application to "execute OCR processing" on a Portable Document Format (PDF) file generated by scanning a document with the image processing apparatus 80 and then "upload the file to an external storage" (refer to FIG. 2). In "executing OCR processing" of this flow, a language for scanning is set, but if the system developer changes specification of the application development tool so that a scan function of language A cannot be selected, existing application that has selected this parameter will have a problem when executing the flow. Instead of modifying the existing function, it is possible to release a new function that improves the existing function, but this method will increase the number of similar functions in the system and cause a difficulty for the application developers to know which function to use. In view of the above, the information processing system 1 enables the application developer to select settings to be used when creating an application including the desired function and prevents an increase in settings having the similar function.

The image processing apparatus 80 is used by a service user who uses the service provided by the service providing system 10. The image processing apparatus 80 is, for example, an image forming apparatus including a communication function and an image processing function such as a multifunction peripheral/printer/product (MFP), a facsimile, a scanner, or a printer. The service user performs processing related to the service provided by the service providing system 10 using the image processing apparatus 80 in a service usage environment.

The devices installed in the service usage environment are not limited to the image processing apparatus 80, but may be a projector (PJ), an interactive whiteboard (IWB: an electronic whiteboard capable of mutual communication), a PC, an industrial machine such as a machine tool, a medical device, a three-dimensional (3D) printer or an imaging device, an air conditioning system, an autonomous traveling robot, or the like. Further, the image processing apparatus 80 may be a portable handy printer, a handy scanner, or the like, as well as a device installed at a specific place in the service usage environment.

Figure 3:
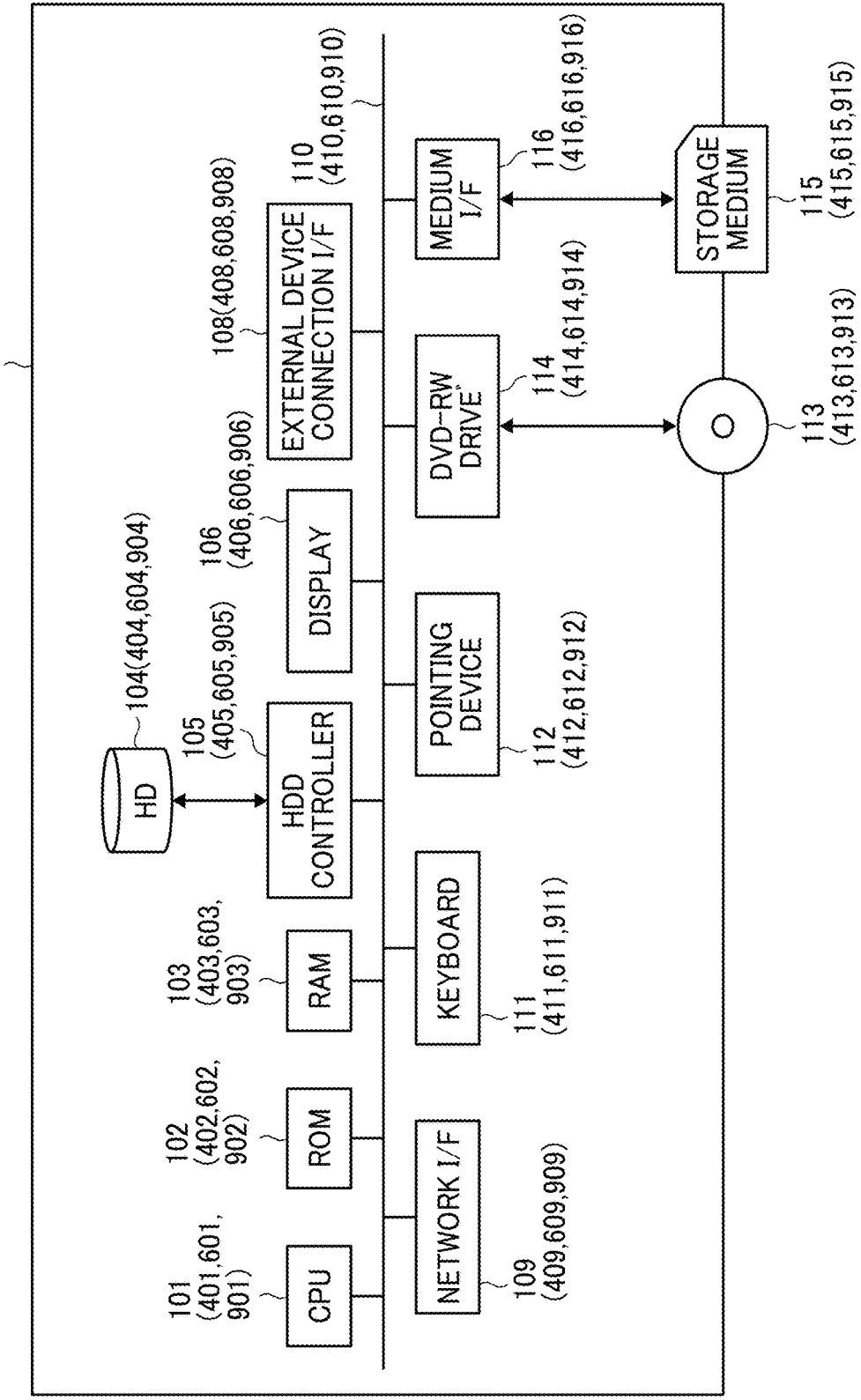
FIG. 3 is a block diagram illustrating an example of a hardware configuration of a service providing system, a communication terminal, and an external storage system.
Figure 4:
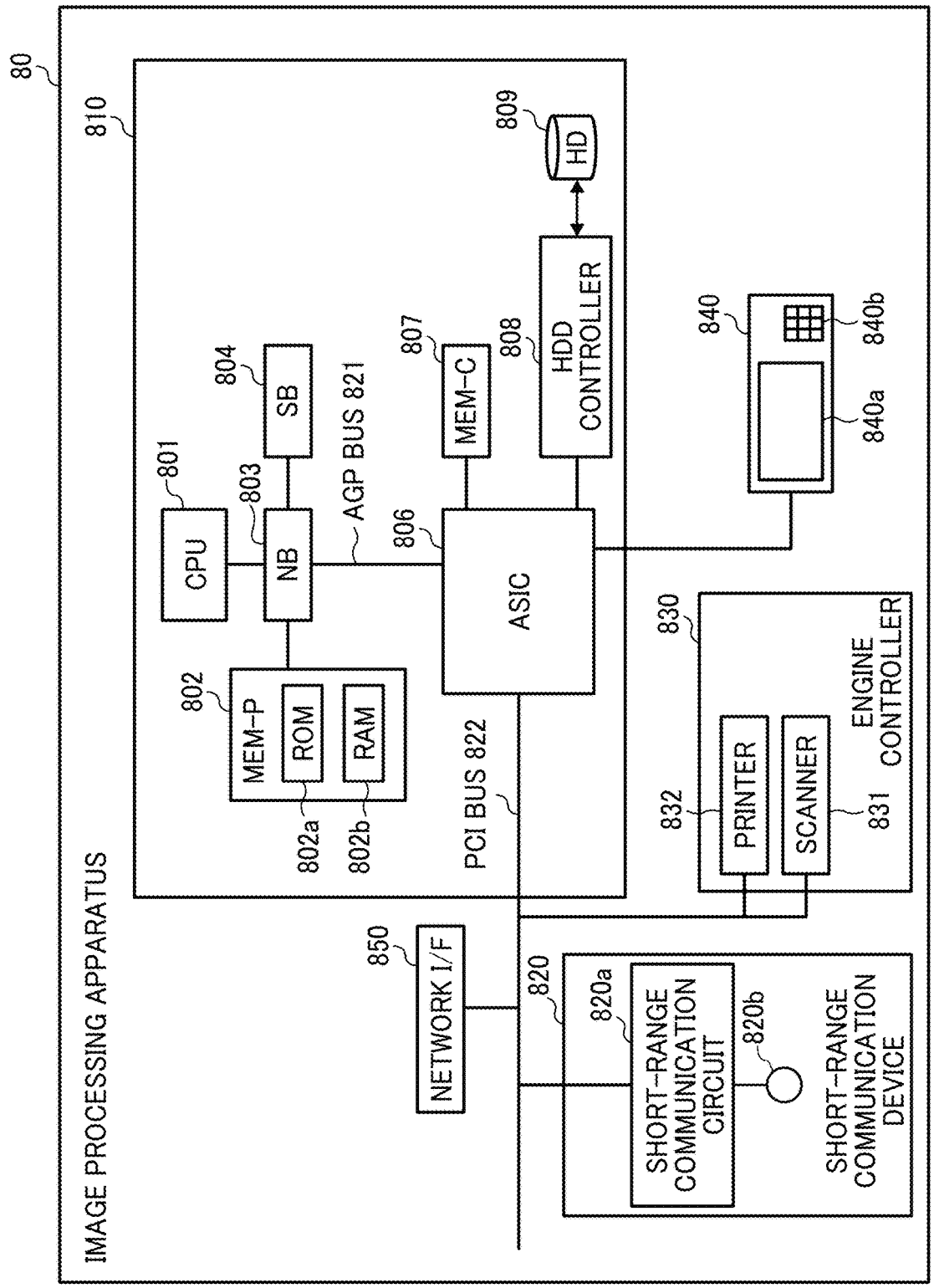
FIG. 4 is a block diagram illustrating an example of a hardware configuration of an image processing apparatus.

With reference to FIGS. 3 and 4, a hardware configuration of the device or terminal included in the information processing system according to the present embodiment is described. The hardware configuration of the device or terminal illustrated in FIGS. 3 and 4 may have components added or deleted as necessary.

FIG. 3 is a block diagram illustrating an example of a hardware configuration of the service providing system. Each hardware of the service providing system 10 is denoted by a number in the 100 series. The service providing system 10 is implemented by a computer, and as illustrated in FIG. 3, includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network (I/F) 109, a bus line 110, a keyboard 111, a pointing device 112, a digital versatile disc rewritable (DVD-RW) drive 114 and a medium I/F 116.

Among the above described elements, the CPU 101 controls all operations of the service providing system 10. The ROM 102 stores a program used for executing the CPU 101, such as an initial program loader (IPL). The RAM 103 is used as a work area of the CPU 101. The HD 104 stores various data such as a control program. The HDD controller 105 controls reading or writing of various data from or to the HD 104 under the control of the CPU 101. The display 106 displays various information such as a cursor, menu, window, characters, or image. The display 106 is an example of a display. In one example, the display 106 is a touch panel display provided with an input device. The external device connection I/F 108 is an interface for connecting the computer to various external devices. The external device in this case is, for example, a Universal Serial Bus (USB) memory or a printer. The network I/F 109 is an interface for controlling communication of data through the communication network 5. The bus line 110 is, for example, an address bus or a data bus, which electrically connects the elements such as the CPU 101 illustrated in FIG. 3.

The keyboard 111 is one example of an input device provided with a plurality of keys for enabling a user to input characters, numerals, or various instructions. The pointing device 112 is an example of the input device that allows a user to select or execute a specific instruction, select a target for processing, or move a cursor being displayed. The input device is not limited to the keyboard 111 and the pointing device 112, and may be a touch panel, a voice input device, or the like. The DVD-RW drive 114 reads and writes various data from and to a DVD-RW 113, which is an example of a removable storage medium. The removable storage medium is not limited to the DVD-RW and may be a digital versatile disk-recordable (DVD-R), a BLU-RAY (registered trademark) disc, or the like. The medium I/F 116 controls reading or writing (storing) of data with respect to a storage medium 115 such as a flash memory.

FIG. 3 is a block diagram illustrating an example of a hardware configuration of the communication terminal. Each hardware of the communication terminal 40 is indicated by a code in the 400 series in parentheses. Each hardware of the communication terminal 60 is indicated by a code in the 600 series in parentheses. Since the communication terminal 40 and the communication terminal 60 are implemented by a computer and have the same configuration as the service providing system 10 as illustrated in FIG. 3, the description of each hardware configuration is omitted.

FIG. 3 is a diagram illustrating an example of a hardware configuration of the external storage system. Each hardware of the external storage system 90 is indicated by a code in the 900 series in parentheses. Since the external storage system 90 is implemented by a computer and has the same configuration as the service providing system 10 as illustrated in FIG. 3, the description of each hardware configuration is omitted.

FIG. 4 is a block diagram illustrating an example of a hardware configuration of the image processing apparatus. As illustrated in FIG. 4, the image processing apparatus 80 includes a controller 810, a short-range communication device 820, an engine controller 830, a control panel 840, and a network I/F 850. The controller 810 includes a CPU 801 which is the main part of the computer, a system memory (MEM-P) 802, a north bridge (NB) 803, a south bridge (SB) 804, an application specific integrated circuit (ASIC) 806, a local memory (MEM-C) 807 as an example of storage unit, an HDD controller 808, and an HD 809 as an example of the storage unit. In the controller 810, the NB 803 and the ASIC 806 are connected by an Accelerated Graphics Port (AGP) bus 821.

The CPU 801 is a control unit that controls the entire image processing apparatus 80. The NB 803 is a bridge for connecting the CPU 801 and the MEM-P 802, SB 804, and the AGP bus 821. The NB 803 includes a memory controller that controls reading and writing to the MEM-P 802, a Peripheral Component Interconnect (PCI) master, and an AGP target. The MEM-P 802 includes a ROM 802a which is a memory for storing programs and data that implements each function of the controller 810, and a RAM 802b which is used as a memory for developing programs and data and a memory for rendering at the time of memory printing. The SB 804 is a bridge for connecting the NB 803 and the PCI bus 822 to peripheral devices. The ASIC 806 is dedicated to image processing that includes hardware elements for image processing. The ASIC 806 serves as a bridge that connects the AGP bus 821, the PCI bus 822, the HDD controller 808, and the MEM-C 807, respectively. The ASIC 806 includes a PCI target and an AGP master, an arbiter (ARB) which is the core of the ASIC 806, a memory controller that controls the MEM-C 807, and a plurality of direct memory access controllers (DMACs) that rotate image data by hardware logic and the like, and a PCI unit that transfers data between a scanner 831 and a printer 832 through the PCI bus 822. The ASIC 806 may be connected to a USB interface or an Institute of Electrical and Electronics Engineers (IEEE) 1394 interface.

The MEM-C 807 is a local memory used as a copy image buffer and a code buffer. The HD 809 is a storage for accumulating image data, accumulating font data used at the time of printing, and accumulating forms. The HDD controller 808 controls reading or writing of data to the HD 809 according to the control of the CPU 801. The AGP bus 821 is a bus interface for a graphics accelerator card, which has been proposed to accelerate graphics processing. Through directly accessing the MEM-P 802 by high-throughput, speed of the graphics accelerator card is improved. The short-range communication device 820 includes a short-range communication circuit 820a and an antenna 820b of the short-range communication circuit 820a. The short-range communication circuit 820a is a communication circuit for short-range wireless communication such as Near Field Communication (NFC), BLUETOOTH (registered trademark), millimeter wave wireless communication, QUICK RESPONSE (QR) code (registered trademark), visible light, environmental sound, or ultrasonic wave.

The engine controller 830 includes a scanner 831 and a printer 832. The scanner 831 and the printer 832 include an image processing portion such as error diffusion or gamma conversion. The control panel 840 displays a current set value, selection screen, or the like and includes a display panel 840a such as a touch panel that receives input from the operator, and an operation panel 840b including a numeric keypad for receiving set values of conditions related to image formation such as density settings conditions and a start key for receiving copy start instructions. The controller 810 controls the entire image processing apparatus 80, and controls, for example, rendering, communication, input from the control panel 840, and the like. The network I/F 850 is an interface that controls communication of data through the communication network 5. The short-range communication circuit 820a and the network I/F 850 are electrically connected to the ASIC 806 through the PCI bus 822.

Further, any one of the above-described control programs may be recorded in a file in a format installable or executable on a computer-readable storage medium for distribution. Examples of recording media include CD-R (Compact Disc Recordable), DVD (Digital Versatile Disk), Blu-ray Disc, Secure Digital (SD) card, USB memory, and the like. In addition, such storage medium may be provided in the form of a program product to users within a certain country or outside that country. For example, the service providing system 10 implements a display control method according to the present disclosure by executing the program according to the present disclosure.

Figure 5:
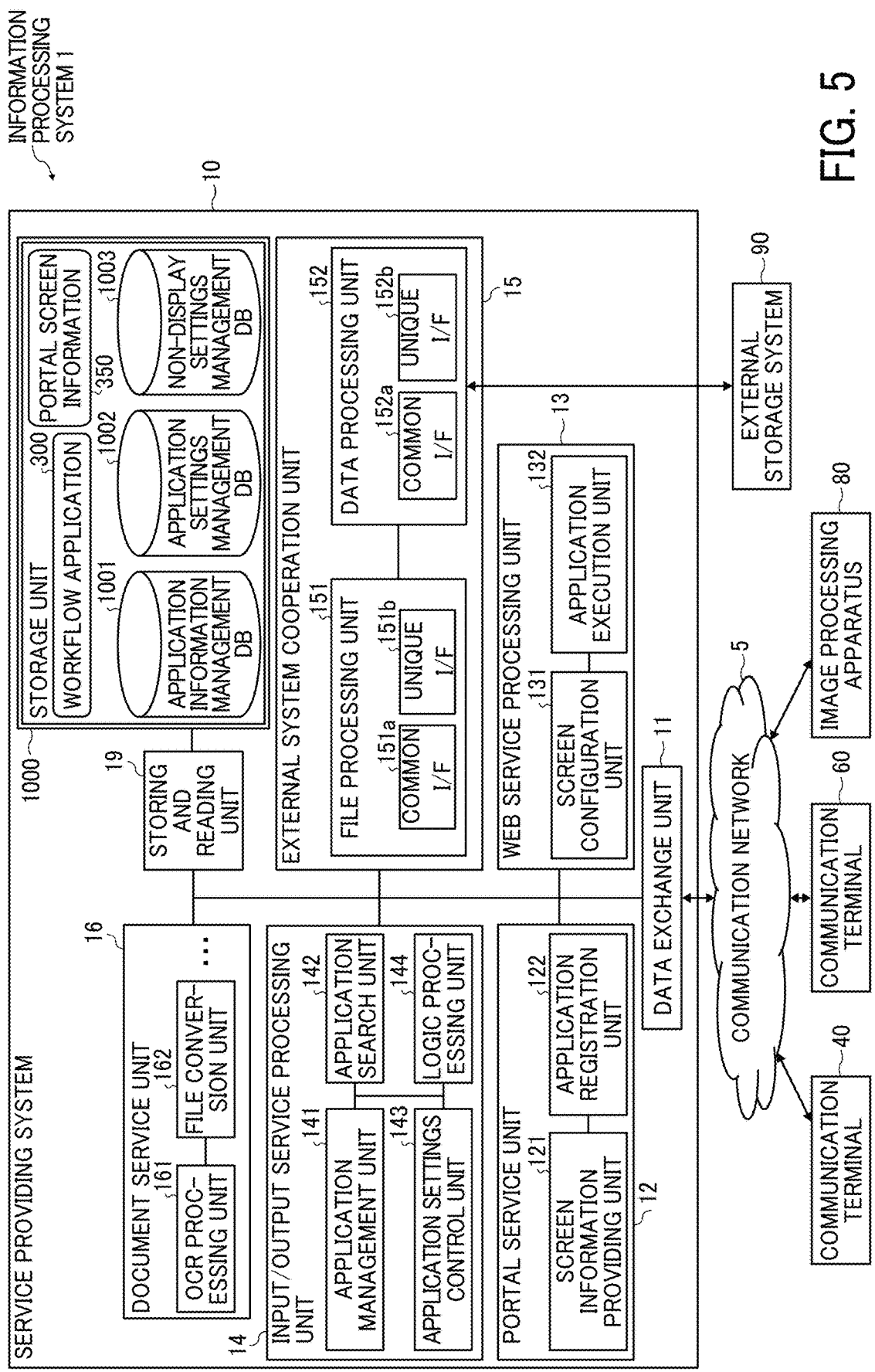
FIG. 5 is a block diagram illustrating an example of a functional configuration of the service providing system.
Figures 11, 12:
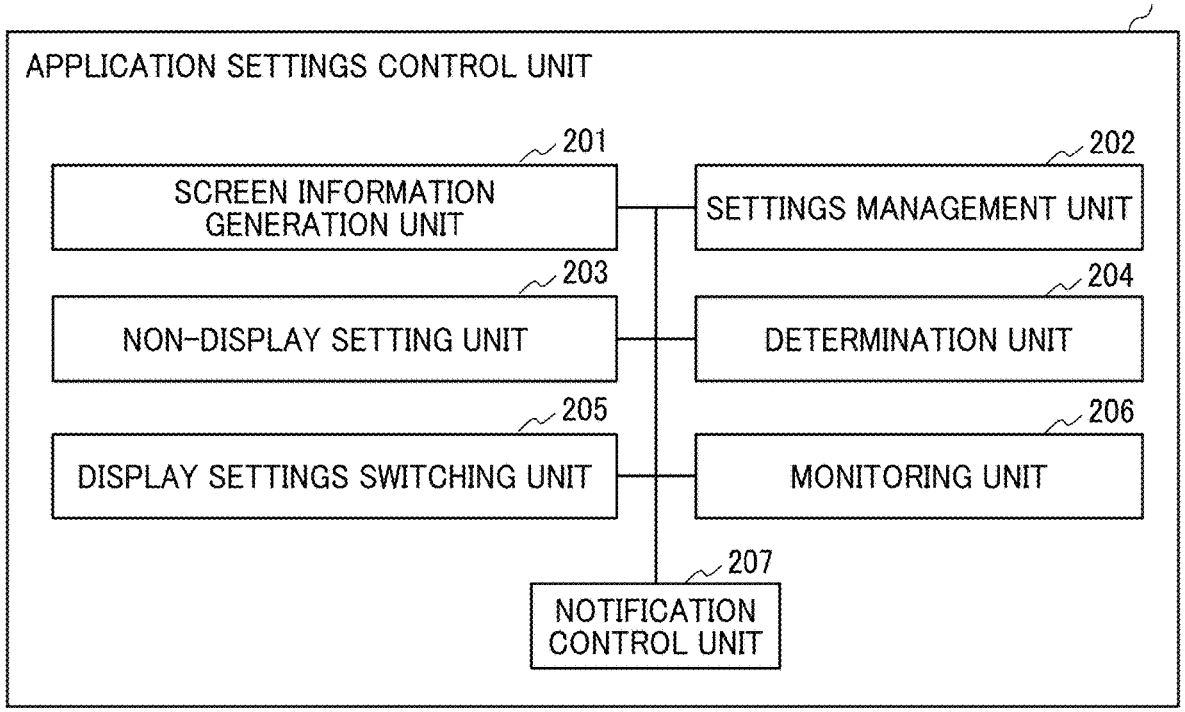
FIG. 11 is a conceptual diagram illustrating an example of a non-display settings management table.
FIG. 12 is a block diagram illustrating an example of a detailed configuration of an application settings control unit.
Figure 13:
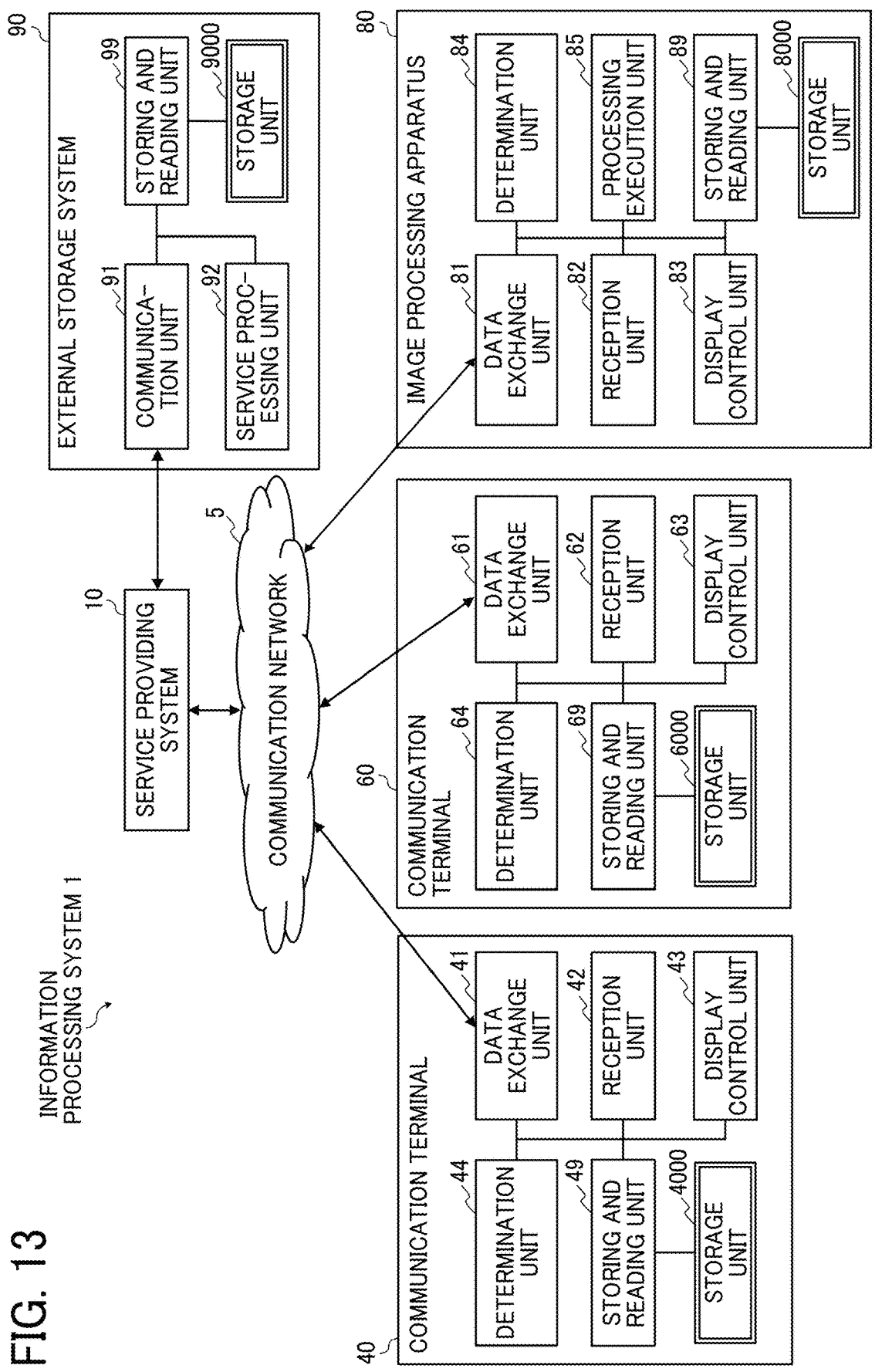
FIG. 13 is a block diagram illustrating an example of a functional configuration of the image processing apparatus, the communication terminal, and the external storage system.

With reference to FIGS. 5 to 13, a functional configuration of the information processing system according to the present embodiment is described. Note that FIGS. 5, 12 and 13 illustrate devices or terminals illustrated in FIG. 1 that are related to processing or operation described below.

FIG. 5 is a block diagram illustrating an example of a functional configuration of the service providing system. The service providing system 10 includes a data exchange unit 11, a portal service unit 12, a web service processing unit 13, an input/output service processing unit 14, an external system cooperation unit 15, a document service unit 16, and a storing and reading unit 19. These units are functions implemented by or caused to function by operating any of the elements illustrated in FIG. 3 in cooperation with the instructions of the CPU 101 according to the device management apparatus program expanded to the RAM 103. In addition, the service providing system 10 includes a storage unit 1000 implemented by the ROM 102, the HD 104, or the storage medium 115 illustrated in FIG. 3.

The data exchange unit 11 is implemented mainly by processing of the CPU 101 and the network I/F 109, and exchanges various data or information to and from another device or terminal through the communication network 5.

The portal service unit 12 is implemented mainly by the processing of the CPU 101 and performs the processing for the application developer to register the application or the like using the communication terminal 60. The portal service unit 12 has a screen information providing unit 121 and an application registration unit 122.

The screen information providing unit 121 outputs portal screen information 350 stored in the storage unit 1000 in response to a request from the communication terminal 40 or the communication terminal 60. Here, a portal is a website on which applications can be registered using a browser. The portal screen information 350 defines various screens such as a portal top screen or an application setting screen. The portal screen information 350 is information in which various screens are defined by, for example, HyperText Markup Language (HTML), Extensible HyperText Markup Language (XHTML), Cascading Style Sheets (CSS), JAVASCRIPT (registered trademark), or the like. The communication terminal 40 and the communication terminal 60 use the browser to display the portal top screen, the setting screen of the application, and the like. Accordingly, the system developer who uses the communication terminal 40 or the application developer who uses the communication terminal 60 performs the application (application information) registration operation on the application setting screen (for example, the setting screen 700 described below).

The application registration unit 122 requests the application management unit 141 to register the application (application information) in response to the request from the screen information providing unit 121. That is, the application registration unit 122 requests the application management unit 141 to register the application when an application registration operation is performed on an application registration screen.

The web service processing unit 13 is implemented mainly by the processing of the CPU 101 and performs processing for the user to use various services by using the image processing apparatus 80. That is, the web service processing unit 13 functions as an application server that provides a web application (application information) to the browser of the image processing apparatus 80. The web service processing unit 13 includes a screen configuration unit 131 and an application execution unit 132.

The screen configuration unit 131 outputs application screen information stored in the storage unit 1000 and application settings information stored in the storage unit 1000 in response to a request from the browser of the image processing apparatus 80. The application screen information defines a template of a screen (application screen) for using the service provided by the application information. The application screen information defines the template of the application screen by, for example, HTML, XHTML, CSS, JAVASCRIPT, or the like. The application settings information defines various settings of the application (application information). The application settings information defines, for example, parameters input by the user, parameters set by default, and the like, among the parameters used for executing a series of processes. The application settings information further defines, for example, input items for the user to input parameters on the application screen, display information on the application screen (for example, application name), and the like. The application settings information is, for example, information in which various application settings are defined by JavaScript Object Notation (JSON) or the like. The image processing apparatus 80 displays an application screen (for example, an application execution screen 950 described below) for using the service provided by the service providing system 10 by the browser.

The application execution unit 132 outputs an application (application information) execution request to the input/output service processing unit 14 in response to a request from the browser of the image processing apparatus 80.

The input/output service processing unit 14 is implemented mainly by the processing of the CPU 101, and performs the processing related to the service provided by the service providing system 10. The input/output service processing unit 14 includes an application management unit 141, an application search unit 142, an application settings control unit 143, and a logic processing unit 144.

The application management unit 141 manages the application information stored in an application information management database (DB) 1001 described below. The application information is an application for using a service implemented by a series of processes. In other words, the various services provided by the service providing system 10 are provided by the application information. Further, the application management unit 141 outputs processing flow information included in the application information in response to a request from the logic processing unit 144. The processing flow information defines a series of processes that implements the service provided by the application information. Further, the application management unit 141 stores the application information in the storage unit 1000 in response to a request from the portal service unit 12. As a result, the application information (application) that provides the service is registered in the service providing system 10.

The application search unit 142 searches for the application settings information of a corresponding application based on search conditions requested by a system administrator. The application settings control unit 143 controls the settings of the application managed by the application management unit 141. The details of the application settings control unit 143 is described below.

The logic processing unit 144 executes processing of various services such as a document service or an external service based on the processing flow information included in the application information in response to a request from the web service processing unit 13. The logic processing unit 144 executes a series of processing (processing flow) for implementing the service provided by the application based on the processing flow information acquired from the application management unit 141. As a result, the service providing system 10 can provide various services such as a file upload service.

The external system cooperation unit 15 is implemented mainly by the processing of the CPU 101 and performs the processing related to the input and output of the file, the processing related to the acquisition or writing of the data, and the like to the external storage system 90. The service providing system 10 includes an external system cooperation unit 15 corresponding to each external storage system 90 for each external storage system 90 that performs processing in cooperation with the service providing system 10.

The external system cooperation unit 15 includes a file processing unit 151 and a data processing unit 152. The file processing unit 151 performs file-related processing (for example, file transmission or file acquisition) on the external storage system 90. The data processing unit 152 performs data processing (for example, acquisition of a folder list, etc.) that can be expressed by text other than a file on the external storage system 90.

The file processing unit 151 includes a common I/F 151a and a unique I/F 151b in which an application programming interface (API) for performing an operation (for example, acquisition, saving, editing, etc.) on an electronic file stored in the external storage system 90 is defined. The common I/F 151a is the API that can be commonly used among a plurality of external storage systems 90. The common I/F 151a is also an API group for using functions related to file operations (for example, file acquisition or storage) that can be used by all the external storage systems 90. On the other hand, the unique I/F 151b is the API that can be used in a specific external storage system 90. The unique I/F 151b is also an API group for using a function related to file operations (for example, adding a file to a document) that can be used in a specific external storage system 90. Accordingly, the common I/F 151a is similarly defined for all external system cooperation units 15. On the other hand, the unique I/F 151b is defined for the external system cooperation unit 15 corresponding to the specific external storage system 90 in which the API defined by the unique I/F 151b can be used.

The data processing unit 152 includes a common I/F 152a and a unique I/F 152b in which an API for acquiring metadata such as bibliographic information of an electronic file (for example, a file list or a folder list, etc.) stored in the external storage system 90 is defined. The common I/F 152a is an API that can be commonly used among a plurality of external storage systems 90. The common I/F 152a is also an API group for using a function related to metadata acquisition that can be used by all the external storage systems 90 (for example, acquisition of a file list or acquisition of a folder list). On the other hand, the unique I/F 152b is an API that can be used in a specific external storage system 90. The unique I/F 152b is also an API group for using a function related to metadata acquisition that can be used in a specific external storage system 90 (for example, acquisition of a list of image files or customer information). Accordingly, the common I/F 152a is similarly defined for all external system cooperation units 15. On the other hand, the unique I/F 152b is defined for the external system cooperation unit 15 corresponding to the specific external storage system 90 in which the API defined by the unique I/F 152b can be used.

As described above, when the external system cooperation unit 15 executes a simple process such as only delivering a file, the common I/F is used to implement the same method for various cooperation services. In addition, the external system cooperation unit 15 implements processing specialized for a partner service by widely utilizing the functions of the specific partner service using the unique I/F.

The document service unit 16 is implemented mainly by the processing of the CPU 101 and executes a predetermined process included in a series of processes (process flow) based on the process flow information. The document service unit 16 includes an OCR processing unit 161 and a file conversion unit 162.

The OCR processing unit 161 performs OCR processing on the electronic file. The file conversion unit 162 performs format conversion, image size conversion, and the like for the electronic file. In addition, the document service unit 16 may include various functional units such as a compression/decompression processing unit for compressing or decompressing an electronic file, or an email transmission unit for transmitting an electronic file by email.

The storing and reading unit 19 is implemented mainly by the processing of CPU 101 and stores various types of information in the storage unit 1000 or reads various types of information from the storage unit 1000. Further, the storage unit 1000 stores the portal screen information 350 indicating the screen contents provided by the workflow application 300 and the portal service unit 12.

FIG. 6 is a conceptual diagram illustrating an example of an application information management table. In the storage unit 1000, the application information management DB 1001 storing the application information management table as illustrated in FIG. 6 is implemented.

The application information management table stores application information associated with an application ID and an application name for identifying an application, a component ID for identifying a component included in the application, and application processing information indicating the processing content of the application. The application processing information includes screen definition which is information to be displayed on the screen used by the user and processing flow information indicating the processing flow in the application. Further, the screen definition includes data definition indicating data to be displayed on the screen and layout information indicating screen layout. The processing flow information describes how to use the processing of the document service or the external system cooperation unit 15.

FIG. 7 is a conceptual diagram illustrating an example of a data definition. FIG. 7 illustrates an array in which the data definitions included in the screen definitions are described. The data definition illustrated in FIG. 7 represents a set of a data ID (data_id), a data name (data_key), a data format (format), and a data source (data_source) as the array. The data name is a parameter for processing. The data format is an element that configures the screen and is the same as the HTML, form element. The data format is, for example, input text, textarea, select, radio and the like. The data source indicates a uniform resource locator (URL) that holds the data. If the data source is fixed, the data may be directly described.

FIG. 8 is a conceptual diagram illustrating an example of layout information. FIG. 8 illustrates an array in which the data ID of the data definition included in the screen definition and the layout information holding the position information for displaying the screen are described. The layout information illustrated in FIG. 8 represents a set of a data ID (data_id), a display name (display_name), and a position information (layout) as an array. The position information may be in a form expressed by coordinate information instead of a form (order) in which the order is specified from the top. When displaying the screen on the communication terminal 40 or the communication terminal 60 (client side) using a client application instead of a browser, or when a complicated screen configuration is required, the service providing system 10 may be configured to interpret the data definition on the client side or in a screen generation process without the layout information.

FIG. 9 is a conceptual diagram illustrating an example of the processing flow information. The processing flow information illustrated in FIG. 9 describes the order in which the external system cooperation unit 15 or the document service unit 16 is used. Various processes include component names, processes, and optional parameter elements. The example of the processing flow information illustrated in FIG. 9 indicates the processing order of "file input", "OCR processing", and "delivery to service-a".

FIG. 10 is a conceptual diagram illustrating an example of an application settings management table. The application settings management table stores application settings information indicating application settings. In the storage unit 1000, an application settings management DB 1002 storing the application settings management table as illustrated in FIG. 10 is implemented.

The application settings management table stores the application settings information associating an application ID that identifies an application, a component ID that identifies a component included in the application, and settings information indicating a component settings. The settings information indicates a set value (parameter) of an associated component.

FIG. 11 is a conceptual diagram illustrating an example of a non-display settings management table. The non-display settings management table stores non-display settings information indicating setting items not to be displayed. A non-display settings management DB 1003 storing a non-display settings management table as illustrated in FIG. 11 is implemented in the storage unit 1000.

The non-display settings management table stores the application ID that identifies the application, the settings information that indicates the settings of the components included in the application, and the non-display settings information associated with the email address of a requester who made a non-display request. The settings information indicates a setting item that has been set to non-display among the set values (parameters) of the components included in the application of the associated application ID. Further, the email address of the requester is an example of destination information indicating destination of the system developer who is the requester of the non-display settings. The destination information may be the Internet Protocol (IP) address, Media Access Control (MAC) address, terminal ID, or the like of the communication terminal 40 used by the system developer.

With reference to FIG. 12, a functional configuration of the application settings control unit 143 included in the input/output service processing unit 14 is described in detail. FIG. 12 is a diagram illustrating an example of a detailed configuration of the application settings control unit. The application settings control unit 143 includes a screen information generation unit 201, a settings management unit 202, a non-display setting unit 203, a determination unit 204, a display settings switching unit 205, a monitoring unit 206, and a notification control unit 207.

The screen information generation unit 201 generates screen information to be displayed on the client side. The settings management unit 202 manages the settings of the application. The settings management unit 202 manages, for example, a setting item for which a non-display request has been made, an application using the setting item for which the non-display request has been made, the email address of the requester, and the like.

The non-display setting unit 203 sets a setting item not to be displayed on the setting screen for setting the application. For example, in response to a non-display set request of a setting item transmitted from the communication terminal 40, the non-display setting unit 203 sets the requested setting item to non-display. The determination unit 204 determines whether there is an application that uses the non-display item set by the non-display setting unit 203.

The display settings switching unit 205 switches, on the setting screen, display and non-display of the setting item of the application set to non-display. The display settings switching unit 205, for example, switches the non-display item to be displayed on the setting screen, when the non-display item set by the non-display setting unit 203 is included in the application settings information.

The monitoring unit 206 monitors for an application that uses the setting item set to non-display by the non-display setting unit 203. The monitoring unit 206 deletes, for example, an application that does not use the setting item set to non-display from the application to be monitored. When there is no application that uses the non-display item, the notification control unit 207 transmits a non-display notice indicating that the setting item has been set to non-display to the requester of the non-display set request. That is, the notification control unit 207 notifies the system developer, who is the requester, that there are no application that use the setting item set to non-display.

With reference to FIG. 13, a functional configuration of the communication terminals 40 and 60, image processing apparatus 80, and external storage system 90 is described. FIG. 13 is a block diagram illustrating an example of the functional configuration of the image processing apparatus, the communication terminal, and the external storage system.

The communication terminal 40 includes a data exchange unit 41, a reception unit 42, a display control unit 43, a determination unit 44, and a storing and reading unit 49. Functions of each of these units are implemented by operating any of the components illustrated in FIG. 3 by an instruction from the CPU 401 according to a communication terminal program developed on the RAM 403. The communication terminal 40 includes a storage unit 4000 implemented by the ROM 402, HD 404, or the storage medium 415 illustrated in FIG. 3.

The data exchange unit 41 is implemented mainly by the processing of the CPU 401 and the network I/F 409, and exchanges various data or information to and from the service providing system 10 through the communication network 5.

The reception unit 42 is implemented mainly by the processing of the CPU 401 and the keyboard 411 or the pointing device 412 and receives various selections or inputs from the user. The display control unit 43 is implemented mainly by the processing of the CPU 401 and causes the display 406 to display various images. The display control unit 43 uses, for example, a browser to display a display screen created by HTML or the like on the display 406. The determination unit 44 is implemented by the processing of the CPU 401 and makes various determinations.

The storing and reading unit 49 is implemented mainly by the processing of CPU 401 and stores various types of information in the storage unit 4000 or reads various types of information from the storage unit 4000.

The communication terminal 60 includes a data exchange unit 61, a reception unit 62, a display control unit 63, a determination unit 64, and a storing and reading unit 69. Functions of each of these units are implemented by operating any of the components illustrated in FIG. 3 by an instruction from the CPU 601 according to a communication terminal program developed on the RAM 603. The communication terminal 60 further includes a storage unit 6000 implemented by the ROM 602, HD 604, or the storage medium 615 illustrated in FIG. 3.

The data exchange unit 61 is implemented mainly by the processing of the CPU 601 and the network I/F 609, and exchanges various data or information to and from the service providing system 10 through the communication network 5.

The reception unit 62 is implemented mainly by the processing of the central processing unit (CPU) 601 and the keyboard 611 or the pointing device 612 and receives various selections or inputs from the user. The display control unit 63 is implemented mainly by the processing of the CPU 601 and causes the display 606 to display various images. The display control unit 63 uses, for example, a browser to display a display screen created by HTML or the like on the display 606. The determination unit 64 is implemented by the processing of the CPU 601 and makes various determinations.

The storing and reading unit 69 is implemented mainly by the processing of CPU 601 and stores various types of information in the storage unit 6000 or reads various types of information from the storage unit 6000.

The image processing apparatus 80 includes a data exchange unit 81, a reception unit 82, a display control unit 83, a determination unit 84, a processing execution unit 85, and a storing and reading unit 89. Functions of each of these units are implemented by operating any of the components illustrated in FIG. 4 by a command from the CPU 801 according to a program for an image processing apparatus developed on the RAM 802b from the HD 809. The image processing apparatus 80 further includes a storage unit 8000 implemented by the ROM 802a or the HD 809 illustrated in FIG. 4.

The data exchange unit 81 is implemented mainly by the processing of the CPU 801 and the network I/F 850, and exchanges various data or information to and from the service providing system 10 through the communication network 5.

The reception unit 82 is implemented mainly by the processing of the CPU 801 and the control panel 840 and receives various selections or inputs from the user. The display control unit 83 is implemented mainly by the processing of the CPU 801 and causes the control panel 840 to display various images. The display control unit 83 uses, for example, a browser to display a display screen created by HTML or the like on the control panel 840. The determination unit 84 is implemented by the processing of the CPU 801 and makes various determinations. The processing execution unit 85 is implemented mainly by the processing of the CPU 801 and the engine controller 830. The processing execution unit 85 executes an image data printing process.

The storing and reading unit 89 is implemented mainly by the processing of the CPU 801 and stores various data (or information) in the storage unit 8000 and reads various data (or information) from the storage unit 8000.

The external storage system 90 includes a communication unit 91, a service processing unit 92, and a storing and reading unit 99. Functions of each of these units are implemented by operating any of the components illustrated in FIG. 3 by an instruction from the CPU 901 according to a program for the external storage system developed on the RAM 903. The external storage system 90 further includes a storage unit 9000 implemented by the ROM 902, HD 904, or storage medium 915 illustrated in FIG. 3.

The communication unit 91 is implemented mainly by the processing of the CPU 901 and communicates various data or information with the service providing system 10. The service processing unit 92 is implemented mainly by the processing of the CPU 901 and executes the processing for providing a service in response to the request from the service providing system 10.

The storing and reading unit 99 is implemented mainly by the processing of the CPU 901 and stores various data (or information) in the storage unit 9000 and reads various data (or information) from the storage unit 9000.

Figure 14:
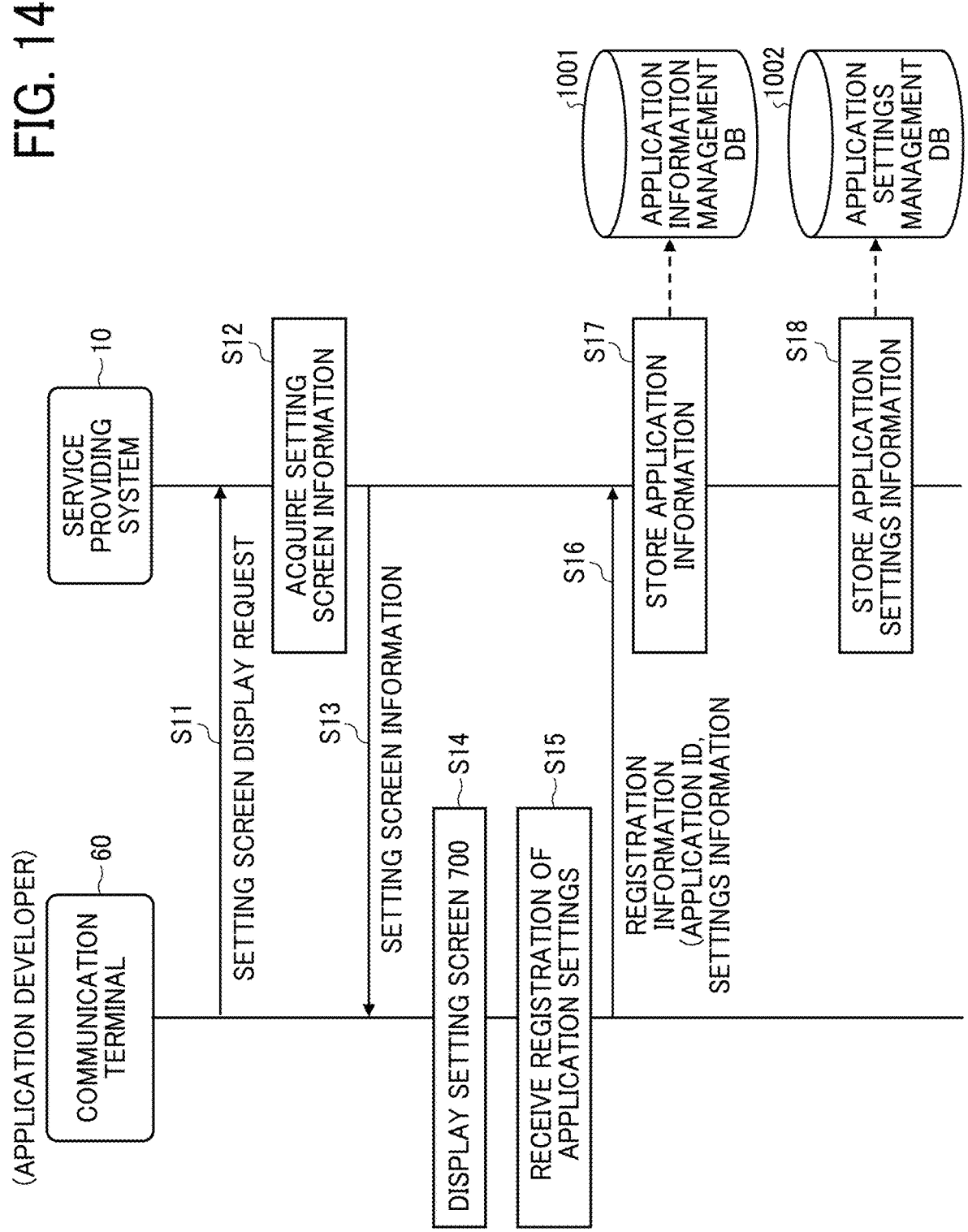
FIG. 14 is a sequence diagram illustrating an example of an application registration process by an application developer.
Figure 15:
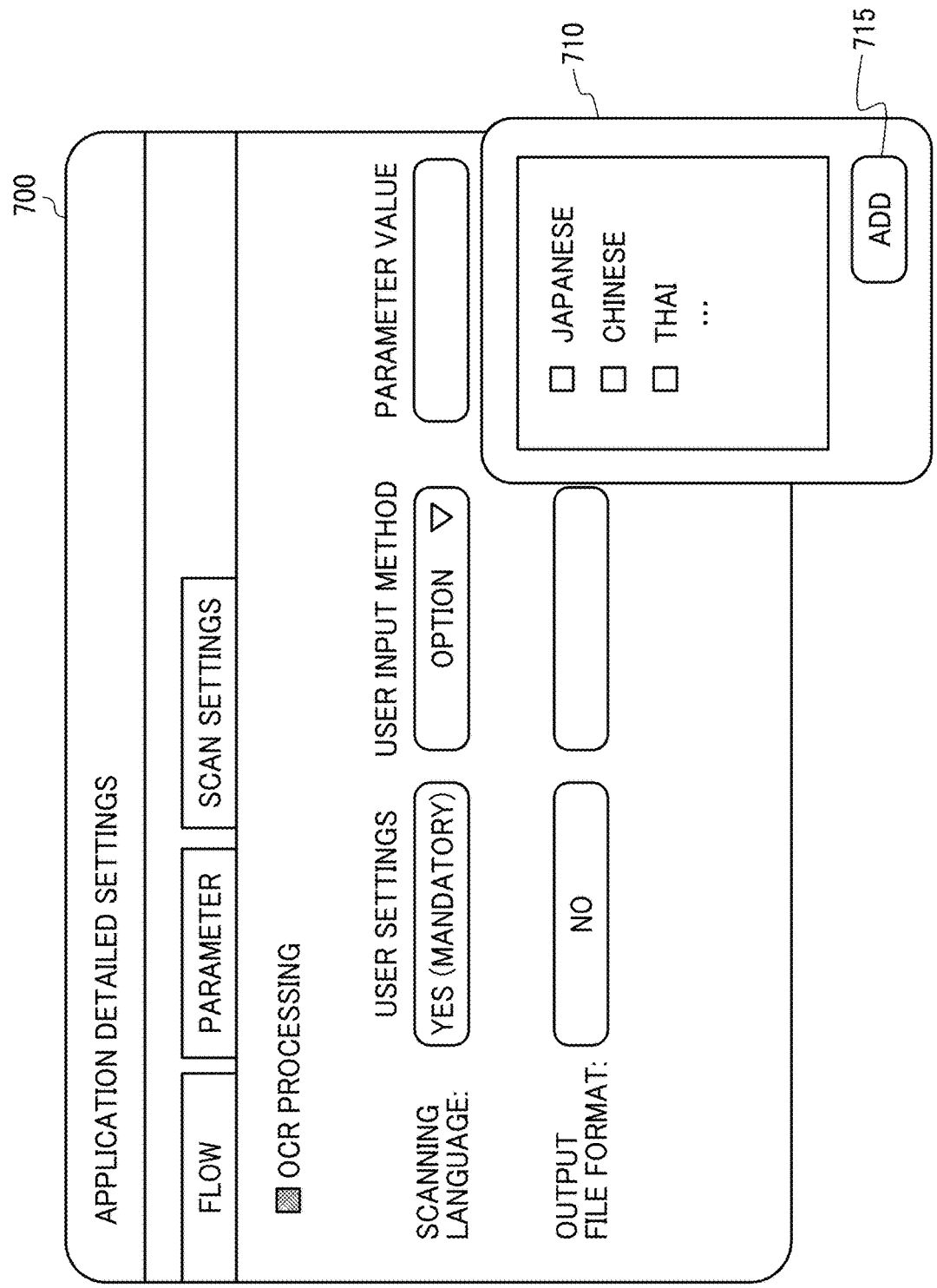
FIG. 15 is a diagram illustrating an example of a setting screen displayed on the communication terminal.

With reference to FIGS. 14 to 27, the processing or operation of the information processing system according to the present embodiment is described. With reference to FIGS. 14 to 16, a process when the application developer creates a new application is described. FIG. 14 is a sequence diagram illustrating an example of an application registration process initiated by the application developer.

In step S11, in response to an input operation or the like on the input device by the application developer, the data exchange unit 61 of the communication terminal 60 transmits a display request of the setting screen to the service providing system 10. Accordingly, the data exchange unit 11 of the service providing system 10 receives the display request transmitted from the communication terminal 60.

In step S12, the portal service unit 12 of the service providing system 10 acquires the setting screen information stored in the storage unit 1000 in response to the display request received in step S11. Specifically, the screen information providing unit 121 of the portal service unit 12 reads to acquire the setting screen information which is the portal screen information 350 stored in the storage unit 1000 through the storing and reading unit 19. In step S13, the data exchange unit 11 transmits the setting screen information acquired in step S12 to the communication terminal 60. Accordingly, the data exchange unit 61 of the communication terminal 60 receives the setting screen information transmitted from the service providing system 10.

In step S14, the display control unit 63 of the communication terminal 60 displays the setting screen 700 on the display 606 based on the setting screen information received in step S13. FIG. 15 is a diagram illustrating an example of a setting screen displayed on the communication terminal. The setting screen 700 illustrated in FIG. 15 is a display screen for the application developer to make detailed settings for the application. The application developer uses the setting screen 700 to set the processing flow executed by each component (function) included in the application, the processing flow settings (parameter) of the application, and the content of the scan settings. The example of FIG. 15 illustrates a state when the settings (parameters) of the application are input. The setting screen 700 illustrated in FIG. 15 includes a setting item selection window 710 for selecting a scan language setting item which is an application setting (parameter). In the setting item selection window 710, for example, Japanese, Chinese, and Thai are illustrated as selectable setting items. The setting item selection window 710 further includes an add button 715 to be pressed when adding the selected setting item as an application setting (parameter).

Returning to FIG. 14, in step S15, in response to various input operations on the setting screen 700 and pressing of the add button 715 by the application developer, the reception unit 62 of the communication terminal 60 receives registration of input application settings. In step S16, the data exchange unit 61 transmits the registration information received in step S15 to the service providing system 10. The registration information includes the application ID of the application for which the registration of the application settings has been received in step S15, and the settings information indicating the selected setting item. Accordingly, the data exchange unit 11 of the service providing system 10 receives the registration information transmitted from the communication terminal 60.

FIG. 16 is a conceptual diagram illustrating an example of the registration information transmitted from the communication terminal. The registration information illustrated in FIG. 16 includes an application ID "10000", a component (operation) "ocr", a scan language "Japanese, Chinese, Thai" as application settings and an output format (outputType) "pdf".

In step S17, the portal service unit 12 of the service providing system 10 registers the application information based on the registration information received in step S16. Specifically, the application registration unit 122 of the portal service unit 12 stores in the application information management DB 1001 (refer to FIG. 6) various information included in the received registration information as the application information in association with the application ID received in step S16.

In step S18, the application registration unit 122 of the portal service unit 12 stores in the application settings management DB 1002 (refer to FIG. 10), various information included in the received registration information as the application settings information in association with the application ID received in step S16.

As described above, the service providing system 10 can newly create and register an application and register the settings of the created application in response to a request from the application developer.

Figure 17:
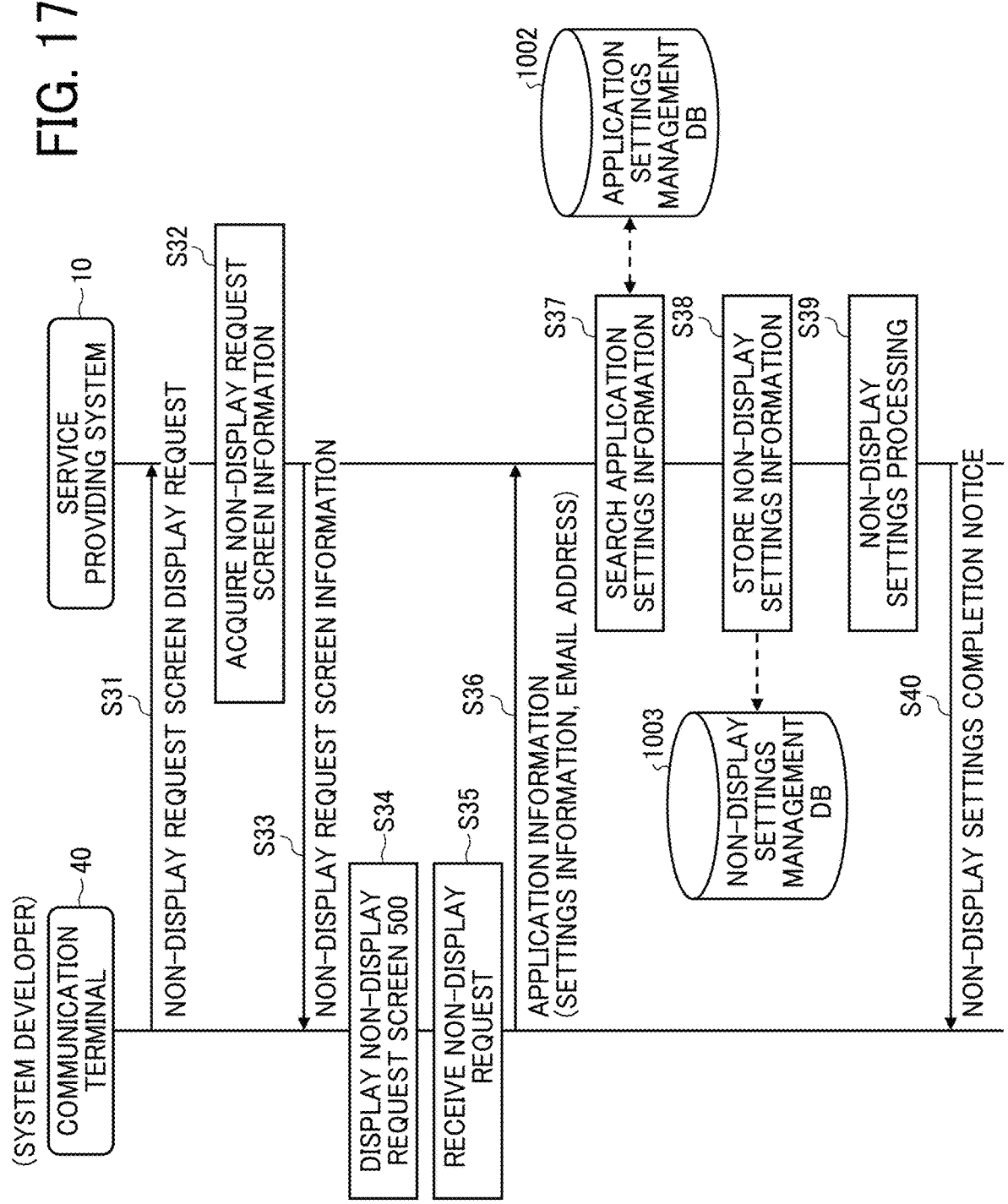
FIG. 17 is a sequence diagram illustrating an example of a non-display settings process executed by a system developer.
Figure 18:
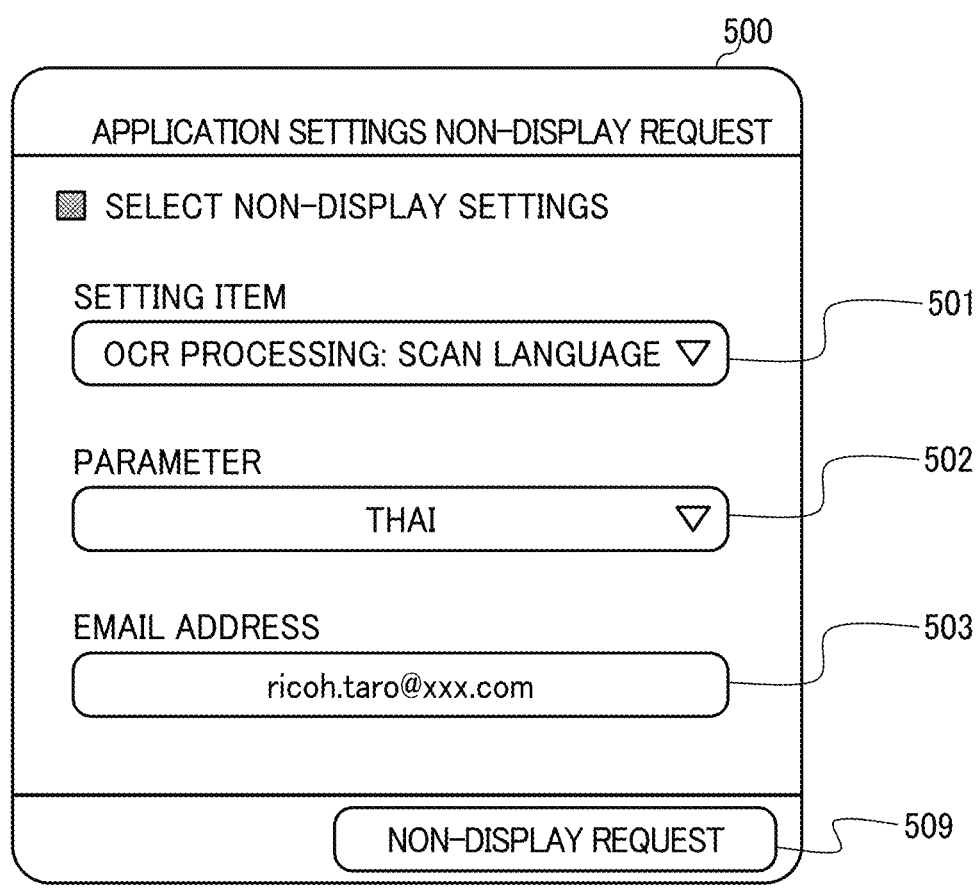
FIG. 18 is a diagram illustrating an example of a non-display request screen displayed on the communication terminal.

With reference to FIGS. 17 and 18, a process when the system developer sets a setting item displayed on the setting screen 700 to non-display is described. FIG. 17 is a sequence diagram illustrating an example of non-display setting process initiated by the system developer. For example, when the system developer releases "Thai ver2.0" that is an improved function of "Thai" that is a parameter of "scan language setting" of "process to execute OCR", in order to prevent the application developer from setting the existing "Thai", the system administrator may prefer setting item of "Thai" not to be displayed on the setting screen 700. In the service providing system 10, a specific setting item on the setting screen 700 is set to non-display by the system developer making a non-display request for the specific setting item on the setting screen 700. A detailed description is given below.

In step S31, the system developer performs an input operation on the input device, and the data exchange unit 41 of the communication terminal 40 transmits a display request for the non-display request screen to the service providing system 10. Accordingly, the data exchange unit 11 of the service providing system 10 receives the display request transmitted from the communication terminal 40.

In step S32, the portal service unit 12 of the service providing system 10 acquires the non-display request screen information stored in the storage unit 1000 in response to the display request received in step S31. Specifically, the screen information providing unit 121 of the portal service unit 12 reads to acquire the non-display request screen information, which is the portal screen information 350 stored in the storage unit 1000, through the storing and reading unit 19. In step S33, the data exchange unit 11 transmits the non-display request screen information acquired in step S32 to the communication terminal 40. Accordingly, the data exchange unit 41 of the communication terminal 40 receives the non-display request screen information transmitted from the service providing system 10.

In step S34, the display control unit 43 of the communication terminal 40 causes a non-display request screen 500 to be displayed on the display 406 based on the non-display request screen information received in step S33. FIG. 18 is a diagram illustrating an example of the non-display request screen displayed on the communication terminal. The non-display request screen 500 illustrated in FIG. 18 is a display screen for the system developer to request not to display a setting item on the setting screen 700. The non-display request screen 500 includes a setting item selection field 501 for selecting the setting item of the application for making the non-display request, a setting parameter selection field 502 for selecting a parameter for making the non-display request, a destination input field 503 for inputting a destination of the requester (system developer), and a non-display request button 509 to be pressed when making the non-display request for the selected item. The items selected in the setting item selection field 501 and the setting parameter selection field 502 are the settings information subject for the non-display request. In the example of FIG. 18, the settings information subject for the non-display request is a component (function); "OCR", and a scan language; "Thai". Further, the email address (destination information) of the system developer is input into the destination input field 503.

Returning to FIG. 17, in step S35, in response to the various input operations on the non-display request screen 500 and pressing of the non-display request button 509 by the application developer, the reception unit 42 of the communication terminal 40 receives the non-display request. In step S36, the data exchange unit 41 transmits the application information received in step S35 to the service providing system 10. The application information includes the settings information received in step S35 and the email address of the system developer. Accordingly, the data exchange unit 11 of the service providing system 10 receives the application information transmitted from the communication terminal 40.

In step S37, the input/output service processing unit 14 of the service providing system 10 searches for the application settings information based on the application information received in step S36. Specifically, the application search unit 142 of the input/output service processing unit 14 searches the application settings management DB 1002 (refer to FIG. 10) using the settings information received in step S36 as a search key and acquires the application ID associated with the same settings information as the received settings information.

In step S38, the application settings control unit 143 of the input/output service processing unit 14 registers the non-display settings information based on the search result in step S37. Specifically, the settings management unit 202 of the application settings control unit 143 stores the application ID, which is the search result in step S37, the non-display settings information associated with the settings information, and the email address received in step S36 in the non-display settings management DB 1003 (refer to FIG. 11). In step S39, the application settings control unit 143 sets the non-display settings for the setting item based on the non-display settings information stored in step S38. Specifically, the non-display setting unit 203 of the application settings control unit 143 sets the setting items included in the non-display settings information not to be displayed on the setting screen 700. Then, the screen information generation unit 201 generates the setting screen information corresponding to the non-display settings by the non-display setting unit 203.

In step S40, the notification control unit 207 of the application settings control unit 143 transmits to the system developer (communication terminal 40 used by the system developer) who is the destination of the email address received in step S36, a non-display settings completion notice indicating that the non-display settings are made. Accordingly, the system developer receives the non-display settings completion notice transmitted from the service providing system 10 and grasp that the non-display settings for the requested setting item is completed.

As described above, the service providing system 10 sets the non-display settings to a specific setting item on the setting screen 700 used by the application developer in response to a request from the system developer. In addition, the service providing system 10 can prevent a new application that uses the non-display setting item from being created.

Figure 19:
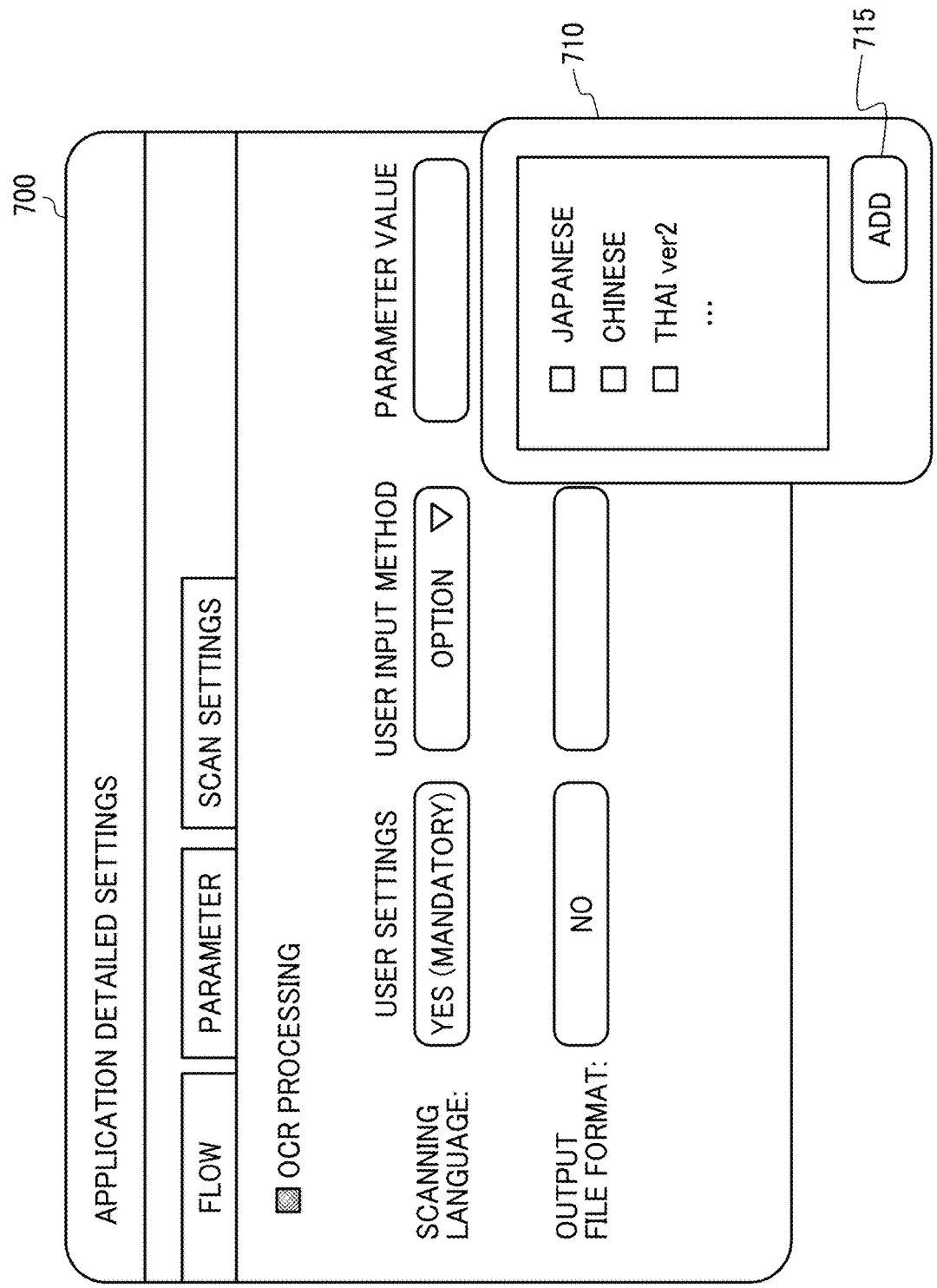
FIG. 19 is a diagram illustrating another example of the setting screen displayed on the communication terminal.
Figure 20:
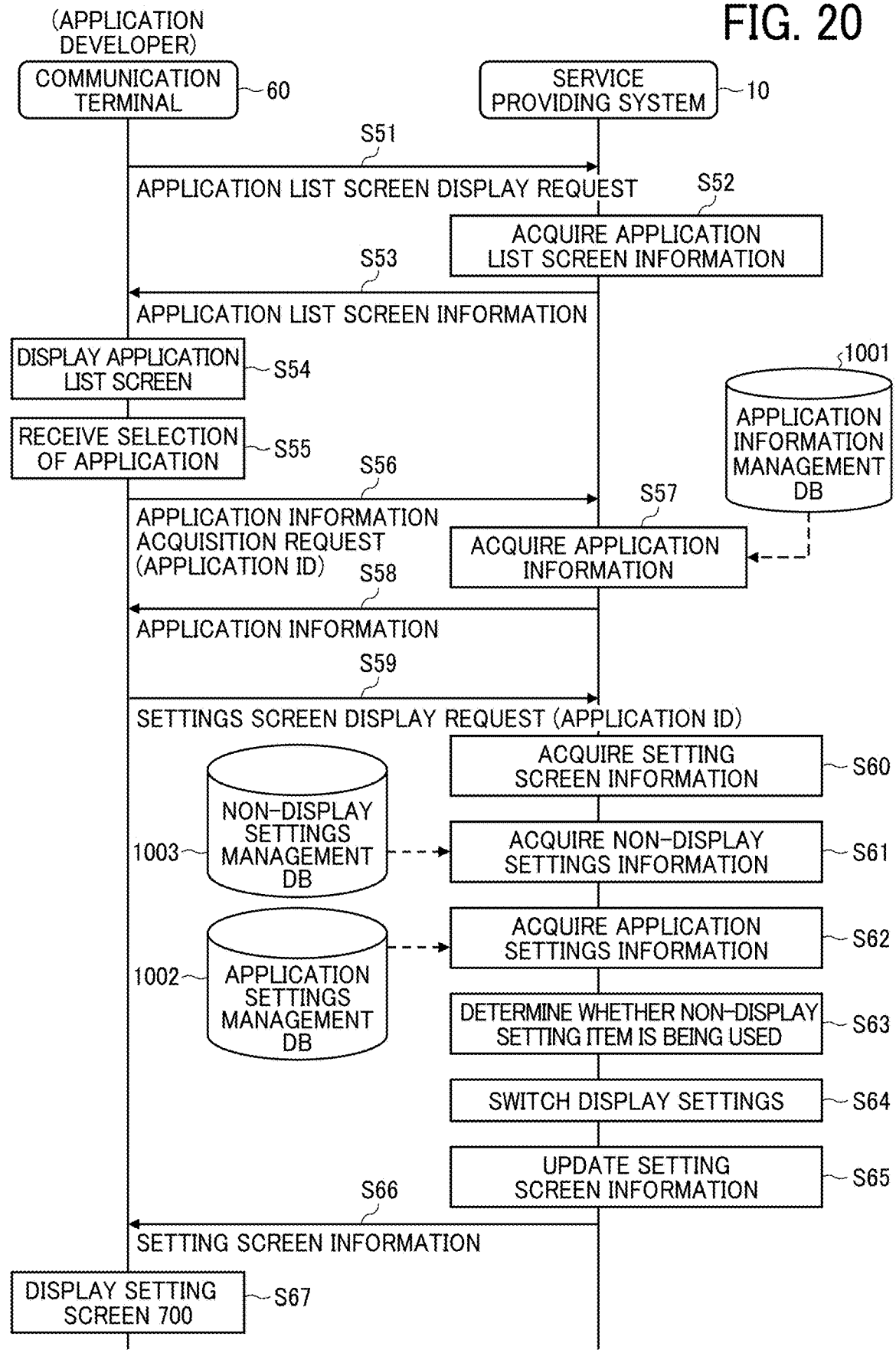
FIG. 20 is a sequence diagram illustrating an example of an application settings update process initiated by the application developer.
Figure 21:
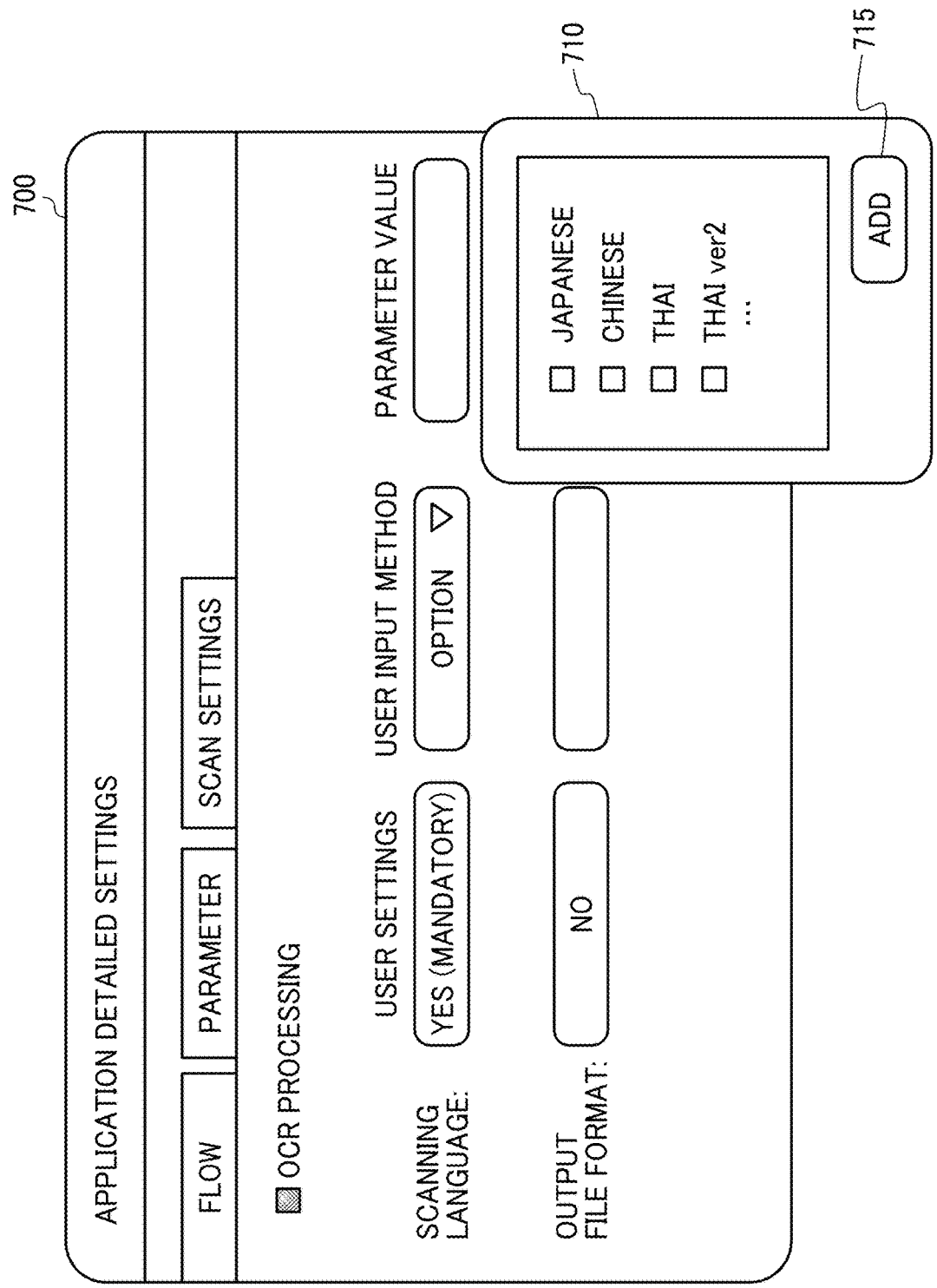
FIG. 21 is a diagram illustrating another example of the setting screen displayed on the communication terminal.

With reference to FIGS. 19 to 21, a process in which the application developer updates the settings of the application is described. When the application developer is developing an application that uses a setting item set to non-display before the system developer makes a non-display request as illustrated in FIG. 17, the application developer cannot change the setting if the setting item is set to non-display when registering the update of the application.

FIG. 19 illustrates a setting screen for setting a specific setting item to non-display. In the setting item selection window 710 of the setting screen 700 illustrated in FIG. 19, "Thai ver2.0" is newly added and "Thai" is not displayed compared with the setting screen 700 illustrated in FIG. 15. In this case, the application developer cannot change the settings when the application developer wants to update an application that uses "Thai". Therefore, when there is an application that uses the non-display item, the service providing system 10 switches the non-display item from non-display to displayed on the setting screen of the application. With reference to FIG. 20, a detailed description is given below. FIG. 20 is a sequence diagram illustrating an example of an application settings update process initiated by the application developer.

In step S51, the application developer performs an input operation on the input device, and the data exchange unit 61 of the communication terminal 60 transmits a display request for an application list screen to the service providing system 10. Accordingly, the data exchange unit 11 of the service providing system 10 receives the display request transmitted from the communication terminal 60.

In step S52, the portal service unit 12 of the service providing system 10 acquires the application list screen information stored in the storage unit 1000 in response to the display request received in step S51. Specifically, the screen information providing unit 121 of the portal service unit 12 read to acquire the application list screen information, which is included in the portal screen information 350 stored in the storage unit 1000, through the storing and reading unit 19. In step S53, the data exchange unit 11 transmits the non-display request screen information acquired in step S52 to the communication terminal 60. Accordingly, the data exchange unit 61 of the communication terminal 60 receives the application list screen information transmitted from the service providing system 10.

In step S54, the display control unit 63 of the communication terminal 60 displays an application list screen presenting a list of applications that can be updated by the application developer on the display 606 based on the application list screen information received in step S53. In step S55, the reception unit 62 receives a selection of application in response to an input operation on the application list screen by the application developer. In step S56, the data exchange unit 61 transmits a request for acquiring application information indicating the application selected in step S55 to the service providing system 10. The acquisition request includes the application ID of the application selected in step S55. Accordingly, the data exchange unit 11 of the service providing system 10 receives the acquisition request transmitted from the communication terminal 60.

In step S57, the input/output service processing unit 14 of the service providing system 10 acquires the application information in response to the acquisition request received in step S56. Specifically, the application management unit 141 of the input/output service processing unit 14 searches the application information management DB 1001 (refer to FIG. 6) using the application ID received in step S56 as a search key and the application information associated with the same application ID as the received application ID is read and acquired through the storing and reading unit 19. In step S58, the data exchange unit 11 transmits the application information acquired in step S57 to the communication terminal 60. Accordingly, the data exchange unit 61 of the communication terminal 60 receives the application information transmitted from the service providing system 10.

In step S59, the data exchange unit 61 of the communication terminal 60 transmits a display request for the setting screen to the service providing system 10. This display request includes the application ID of the application selected in step S55. Accordingly, the data exchange unit 11 of the service providing system 10 receives the display request transmitted from the communication terminal 60.

In step S60, the portal service unit 12 of the service providing system 10 acquires the setting screen information stored in the storage unit 1000 in response to the display request received in step S59. Specifically, the screen information providing unit 121 of the portal service unit 12 read to acquire the setting screen information which is the portal screen information 350 stored in the storage unit 1000 through the storing and reading unit 19.

In step S61, the settings management unit 202 of the application settings control unit 143 searches the non-display settings management DB 1003 (refer to FIG. 11) using the application ID received in step S59 as a search key and the non-display settings information associated with the same application ID as the received application ID is read and acquired through the storing and reading unit 19. In step S62, the settings management unit 202 of the application settings control unit 143 searches the application settings management DB 1002 (refer to FIG. 10) using the application ID received in step S59 as a search key and the application settings information associated with the same application ID as the received application ID is read and acquired through the storing and reading unit 19.

In step S63, the determination unit 204 of the application settings control unit 143 determines whether the non-display item is used based on the non-display settings information acquired in step S61 and the application settings information acquired in step S62. Specifically, the determination unit 204 determines that the application subject for the display request received in step S59 is using the non-display item when the settings information included in the non-display settings information includes the same content as the settings information included in the application settings information. When the non-display settings information of the target application is not acquired in step S61, the determination unit 204 determines that the target application is not using the non-display item. Hereinafter, a case in which the determination unit 204 determined that the non-display item is being used is described.

In step S64, the display settings switching unit 205 of the application settings control unit 143 switches the setting item determined to be used by the target application in step S63 from non-display to display. In step S65, the screen information generation unit 201 of the application settings control unit 143 changes the setting screen information acquired in step S60 to a display state switched in step S64. Then, the screen information providing unit 121 of the portal service unit 12 updates the portal screen information 350 stored in the storage unit 1000 with the setting screen information changed in step S62.

In step S66, the data exchange unit 11 transmits the setting screen information updated in step S65 to the communication terminal 60. Accordingly, the data exchange unit 61 of the communication terminal 60 receives the setting screen information transmitted from the service providing system 10. In step S67, the display control unit 63 of the communication terminal 60 displays the setting screen 700 on the display 606 based on the setting screen information received in step S66. FIG. 21 is a diagram illustrating an example of the setting screen displayed on the communication terminal in step S67. In the setting item selection window 710 of the setting screen 700 illustrated in FIG. 21, the non-display item "Thai" is displayed as compared with the setting screen illustrated in FIG. 19.

As described above, the service providing system 10 switches the display settings to display the non-display item used in the existing application on the setting screen 700 used by the application developer. As a result, the service providing system 10 can prevent the operation of the existing application or the settings change from being affected.

Figure 23:
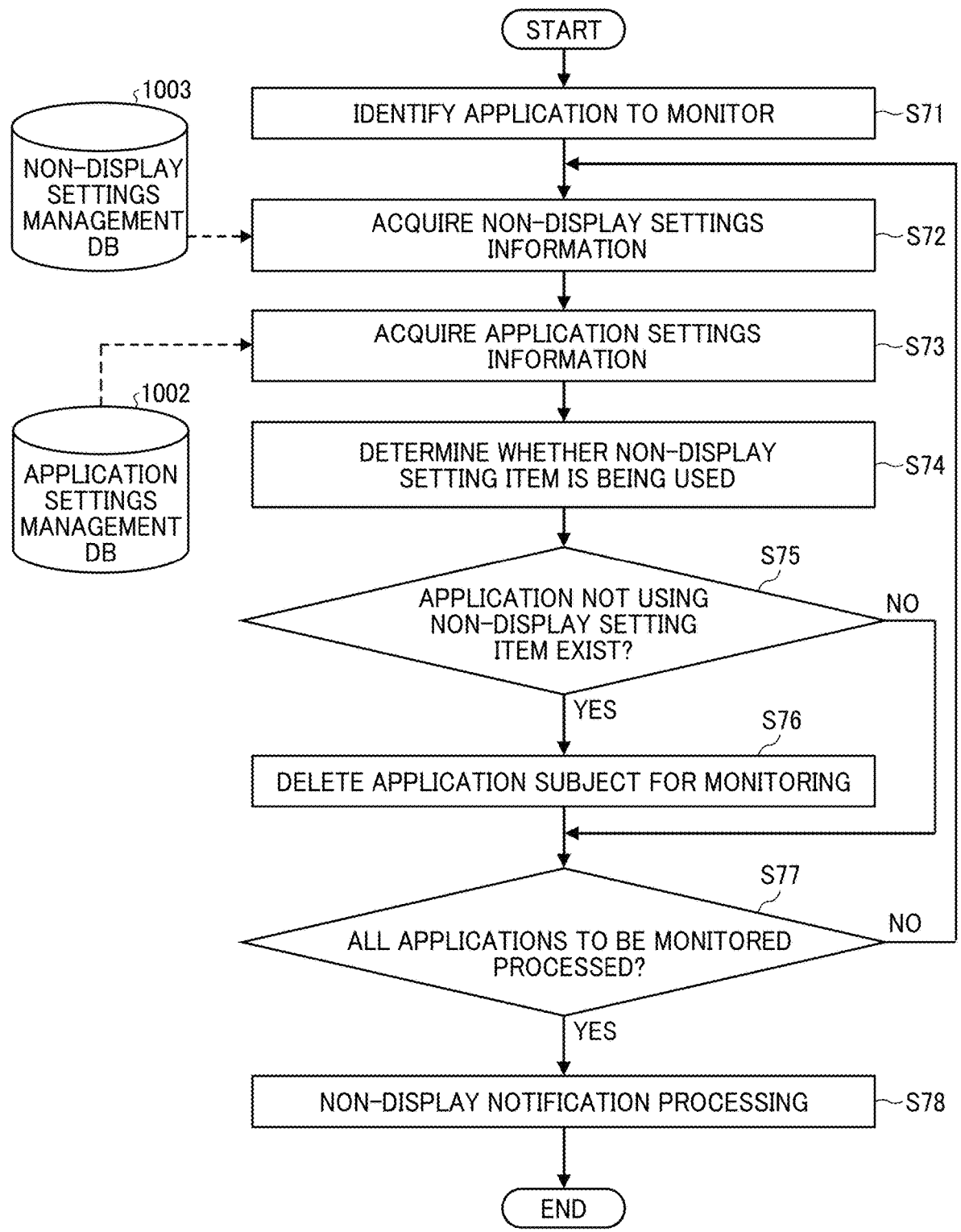
FIG. 23 is a flowchart illustrating an example of an application monitoring process that uses a non-display settings in a service providing system.
Figure 24:
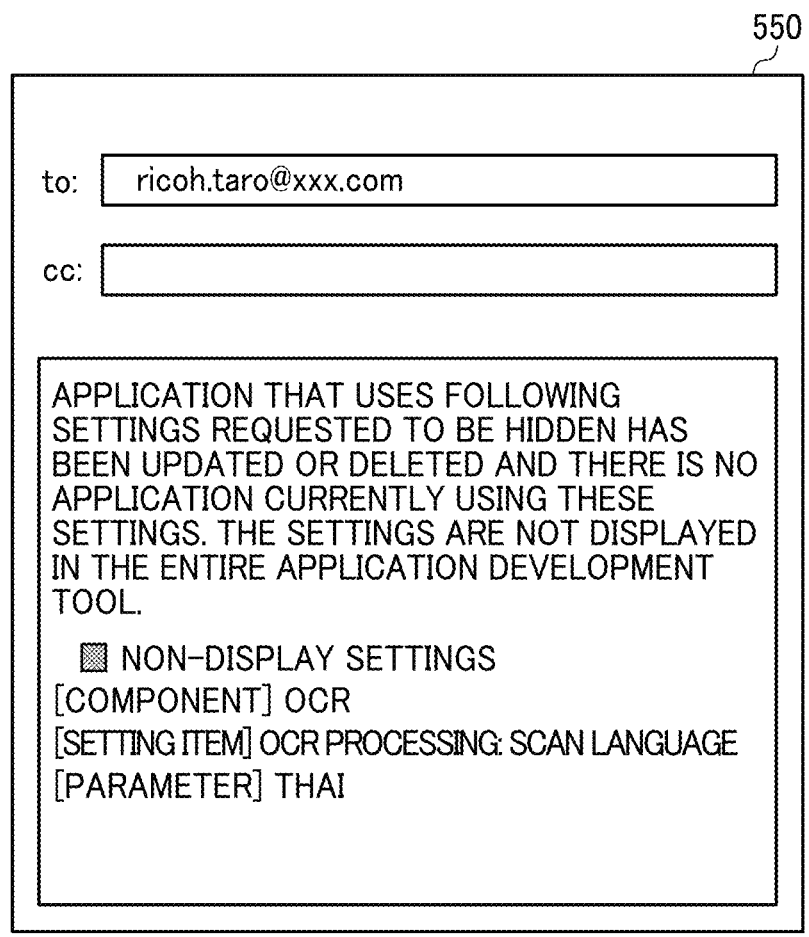
FIG. 24 is a diagram illustrating an example of a non-display notice screen displayed on the communication terminal.

With reference to FIGS. 22, 23, and 24, a process of monitoring an application using a non-display item set by the non-display setting unit 203 is described. The description is assuming that the application developer has updated and registered the setting item (parameter) of "scan language" which is settings of the application from "Thai" to "Thai ver2.0" after the display switching process of the non-display items illustrated in FIG. 20 is executed. FIG. 22 is a conceptual diagram illustrating an example of update information transmitted from the communication terminal. The update information illustrated in FIG. 22 includes the update information of the application ID "10000", the component (operation) "ocr", the scan language (language) "Japanese, Chinese, Thai ver2.0" as the settings of the application, and output format (outputType) "pdf". In this case, the service providing system 10 controls not to display "Thai" as a setting item to be displayed on the setting screen 700. With reference to FIG. 23, a detailed description is given below. FIG. 23 is a flowchart illustrating an example of an application monitoring process that uses a non-display settings in a service providing system.

In step S71, the monitoring unit 206 of the application settings control unit 143 identifies an application to be monitored. The application to be monitored is an application whose display has been switched by the display settings switching unit 205 in step S64. That is, the application to be monitored is an application determined in step S63 as using the non-display item.

In step S72, the settings management unit 202 of the application settings control unit 143 searches the non-display settings management DB 1003 (refer to FIG. 11) using the application ID of the application to be monitored identified in step S71 as a search key and the non-display settings information associated with the same application ID as the application ID of the application to be monitored is read and acquired through the storing and reading unit 19. In step S73, the settings management unit 202 searches the application settings management DB 1002 (refer to FIG. 10) using the application ID of the application to be monitored identified in step S71 as a search key and the application settings information associated with the same application ID as the application ID of the application to be monitored is read and acquired through the storing and reading unit 19.

In step S74, the determination unit 204 of the application settings control unit 143 determines whether the monitored application is using the non-display item based on the non-display settings information acquired in step S72 and the application settings information acquired in step S73. Specifically, the determination unit 204 determines that the monitored application is using the non-display item when the settings information included in the non-display settings information includes the same content as the settings information included in the application settings information. In step S75, when the determination unit 204 determines that the monitored application is application that does not use the non-display item (YES in step S75), the determination unit 204 proceeds the process to step S76. On the other hand, when the determination unit 204 determines that the monitored application is not the application that does not use the non-display item, that is, the monitored application is the application using the non-display item (NO in step S75), the determination unit 204 proceeds the process to step S77.

In step S76, the monitoring unit 206 of the application settings control unit 143 deletes the application determined as not using the non-display item in step S75 from the monitoring target application identified in step S71. As a result, the monitoring unit 206 updates the information of the application to be monitored. In step S77, when all applications to be monitored are processed (YES in step S77), the monitoring unit 206 proceeds the process to step S78. On the other hand, when all applications to be monitored are not processed, that is, there is application to be monitored for further processing (NO in step S77), the monitoring unit 206 repeats the process from step S72.

In step S78, the notification control unit 207 of the application settings control unit 143 transmits a non-display notice indicating that the application that uses the setting item for which the non-display request has been applied no longer exists to the system developer (communication terminal 40 used by the system developer) who is the destination of the email address associated with the application ID of the application to be monitored. Accordingly, the system developer receives the non-display notice transmitted from the service providing system 10 and grasp that the application that uses the applied setting item no longer exists.

FIG. 24 is an illustration of an example of the non-display notice screen displayed on the communication terminal. The non-display notice screen 550 illustrated in FIG. 24 is a display screen displayed on the communication terminal 40 used by the system developer based on the non-display notice transmitted in step S78. The non-display notice screen 550 indicates that the application that uses the applied setting item no longer exists and the content of the non-display settings.

As described above, the service providing system 10 monitors the application that uses the non-display item and by notifying the system developer when the application that uses the non-display item no longer exists, it is possible to let the system developer know that there are no more application that uses the non-display item. In order to prevent the existing application from being affected when the system developer deletes the settings before the improvement among the settings that have been improved, the system developer deletes the target settings from the service providing system 10 after receiving the non-display notice and confirming that the settings before improvement are not used in any of the applications.

Figure 25:
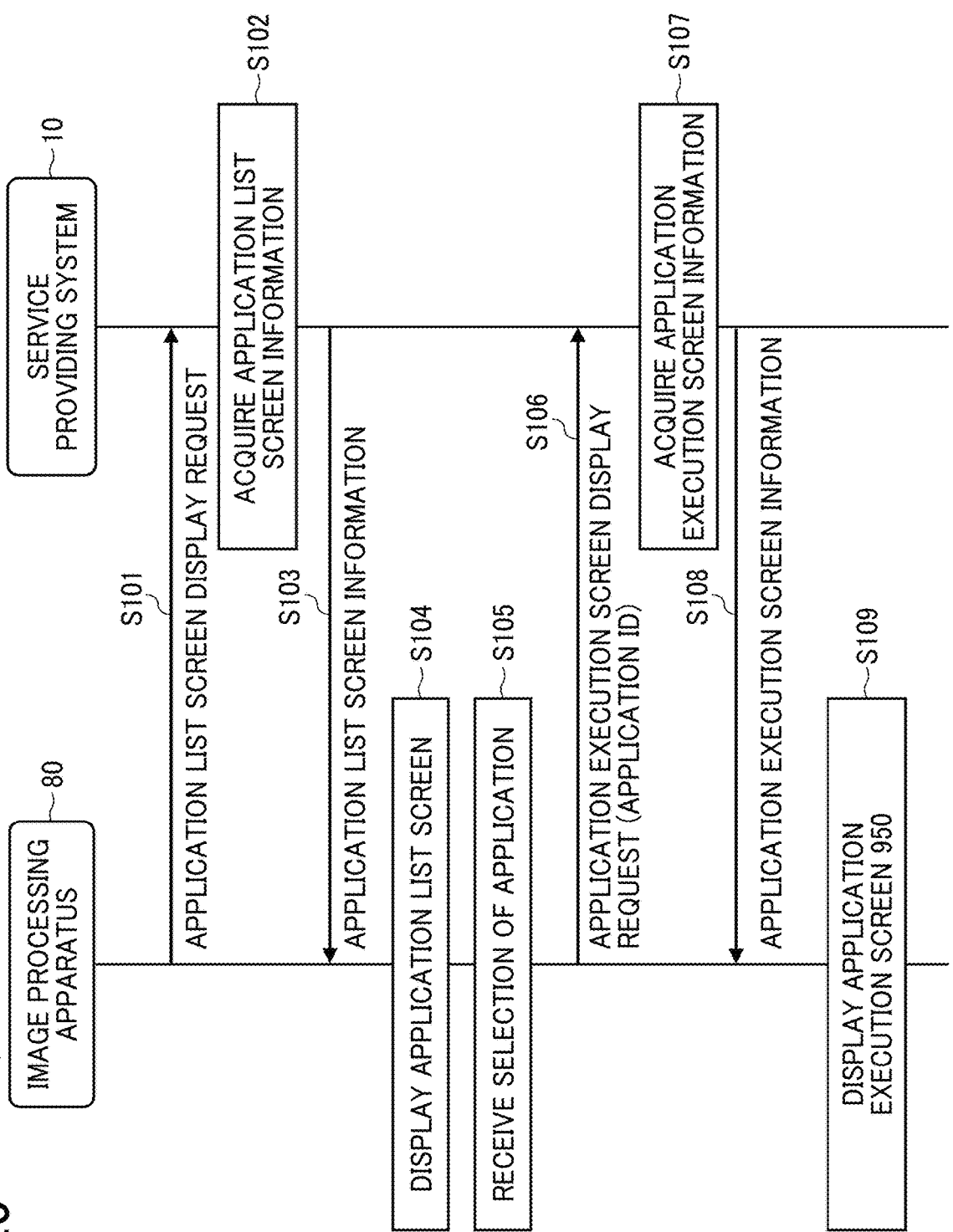
FIG. 25 is a sequence diagram illustrating an example of a processing when a service user uses a service.
Figure 26:
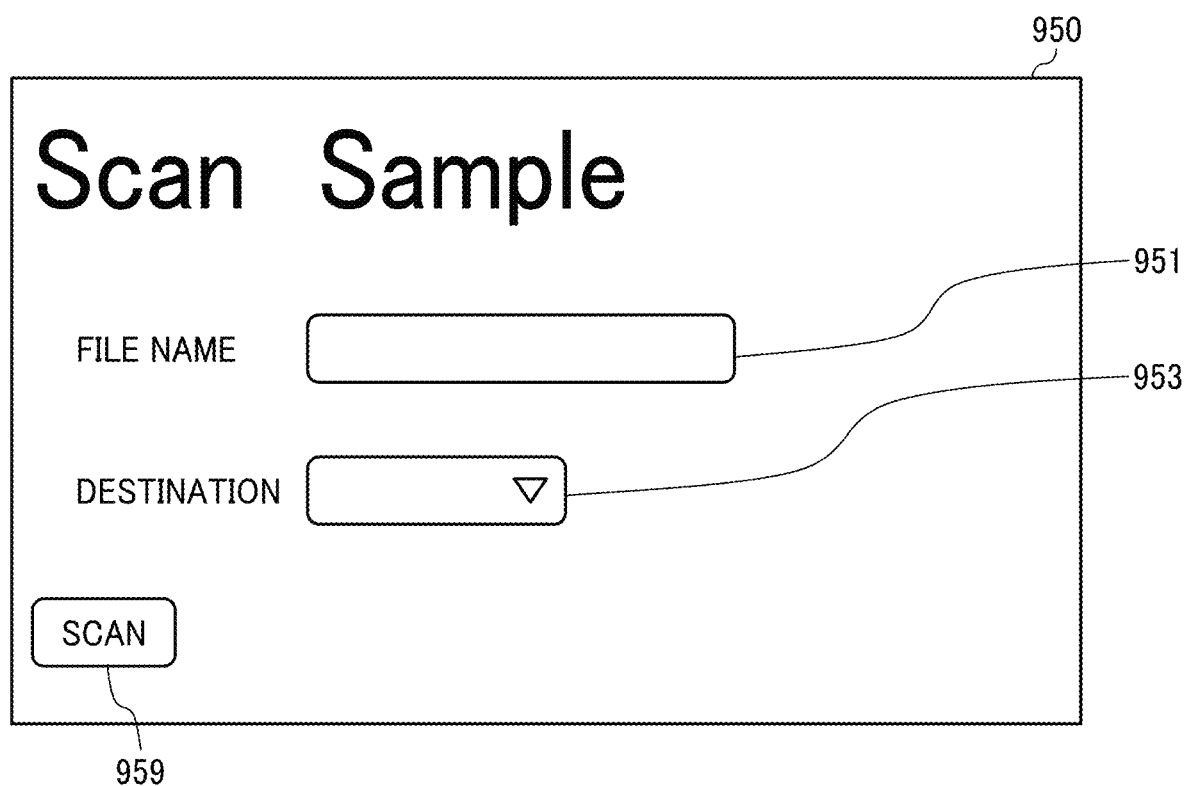
FIG. 26 is a diagram illustrating an example of an application execution screen displayed on the image processing apparatus.
Figure 27:
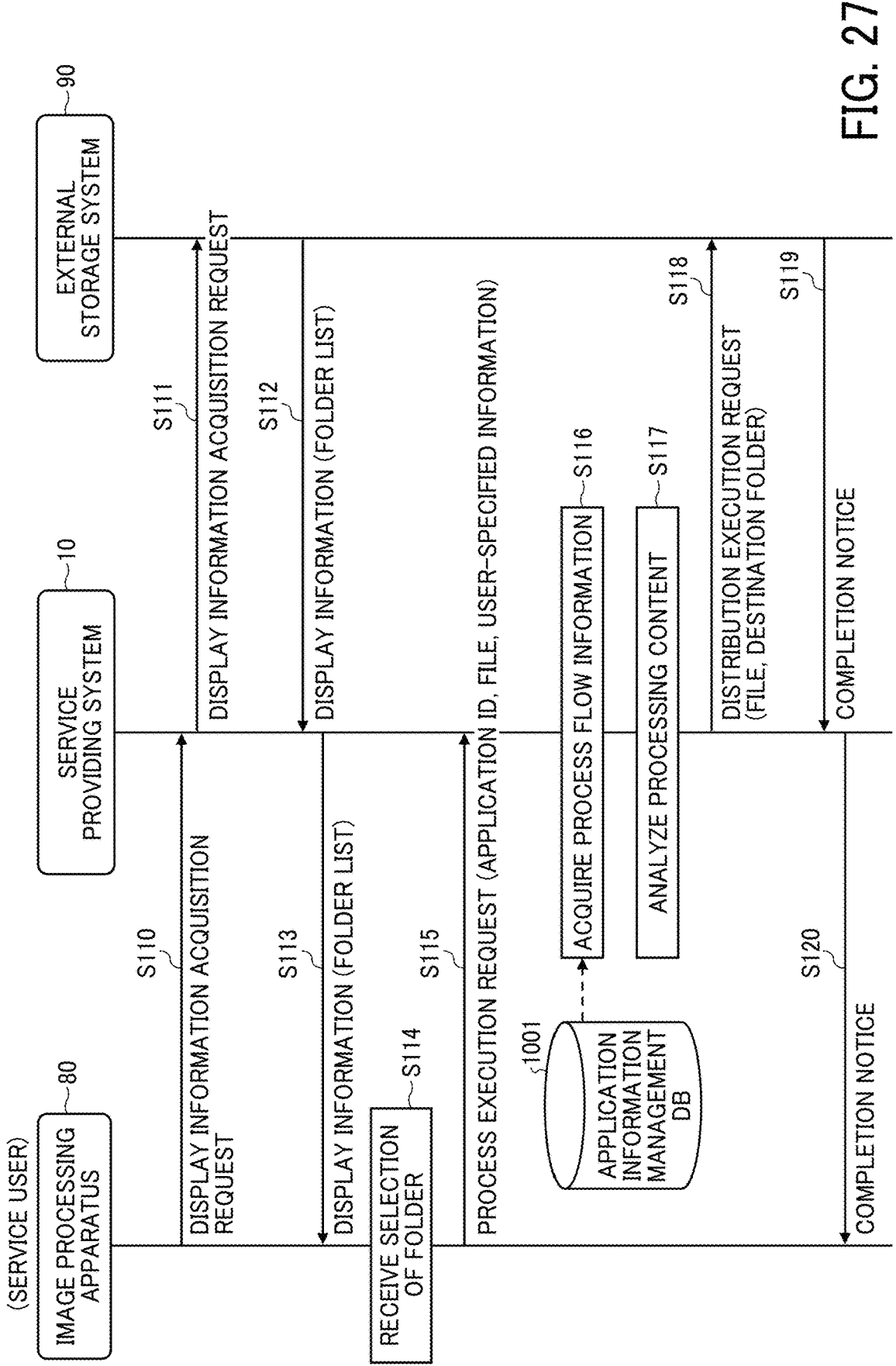
FIG. 27 is a sequence diagram illustrating another example of processing when the service user uses the service.

With reference to FIGS. 25 to 27, a process in which the service user uses the service provided by the service providing system 10 by using the image processing apparatus 80 is described. FIGS. 25 and 27 are sequence diagrams illustrating examples of processing when the service is used by the service user. FIGS. 25 and 27 illustrate the examples in which the service user delivers a scan file by executing an application by the image processing apparatus 80. In this case, the application to be executed is an application that uploads the document data scanned by the image processing apparatus 80 to the external storage system 90.

In step S101, in response to an input operation or the like on the control panel 840 by the service user, the data exchange unit 81 of the image processing apparatus 80 transmits a display request for the application list screen to the service providing system 10. Accordingly, the data exchange unit 11 of the service providing system 10 receives the display request transmitted from the image processing apparatus 80.

In step S102, the web service processing unit 13 of the service providing system 10 acquires the application list screen information stored in the storage unit 1000 in response to the display request received in step S101. Specifically, the screen configuration unit 131 of the web service processing unit 13 read to acquire the application list screen information stored in the storage unit 1000 through the storing and reading unit 19. In step S103, the data exchange unit 11 transmits the application list screen information acquired in step S102 to the image processing apparatus 80. Accordingly, the data exchange unit 81 of the image processing apparatus 80 receives the application list screen information transmitted from the service providing system 10.

In step S104, the display control unit 83 of the image processing apparatus 80 causes the control panel 840 to display an application list screen presenting a list of applications available to the service user based on the application list screen information received in step S103. In step S105, in response to an input operation on the application list screen by the service user, the reception unit 82 receives a selection of an application. In step S106, the data exchange unit 81 transmits a display request for an application execution screen of the application selected in step S105 to the service providing system 10. The display request includes an application ID of the application selected in step S105. Accordingly, the data exchange unit 11 of the service providing system 10 receives the display request transmitted from the image processing apparatus 80.

In step S107, the web service processing unit 13 of the service providing system 10 acquires the application execution screen information stored in the storage unit 1000 in response to the display request received in step S106. Specifically, the screen configuration unit 131 of the web service processing unit 13 reads to acquire the application execution screen information corresponding to the application ID received in step S106 from the storage unit 1000 through the storing and reading unit 19. In step S108, the data exchange unit 11 transmits the application execution screen information acquired in step S107 to the image processing apparatus 80. Accordingly, the data exchange unit 81 of the image processing apparatus 80 receives the application execution screen information transmitted from the service providing system 10.

In step S109, the display control unit 83 of the image processing apparatus 80 displays the application execution screen 950 for executing the application selected in step S105 on the control panel 840 based on the application execution screen information received in step S108. FIG. 26 is a diagram illustrating an example of the application execution screen displayed on the image processing apparatus in step S109. The application execution screen 950 illustrated in FIG. 26 is a display screen displayed when uploading a scan file to an external storage. The application execution screen 950 includes a file name input field 951 for inputting a target file, a distribution destination input field 953 for inputting a file distribution destination (upload destination), and a scan button 959 to be pressed when executing the process.

In step S110 of FIG. 27, the data exchange unit 81 of the image processing apparatus 80 transmits an acquisition request for display information to be displayed on the application execution screen 950 to the service providing system 10. Accordingly, the data exchange unit 11 of the service providing system 10 receives the acquisition request transmitted from the image processing apparatus 80. In step S111, the external system cooperation unit 15 of the service providing system 10 transmits a display information acquisition request to the external storage system 90. Specifically, the data processing unit 152 of the external system cooperation unit 15 transmits the display information acquisition request to the external storage system 90 using, for example, the common I/F 152a. Accordingly, the communication unit 91 of the external storage system 90 receives the acquisition request transmitted from the service providing system 10. Then, the service processing unit 92 of the external storage system 90 executes the process corresponding to the received acquisition request.

In step S112, the communication unit 91 of the external storage system 90 transmits display information to the service providing system 10. The display information includes information on a folder list included in the external storage system 90. Accordingly, the data processing unit 152 of the service providing system 10 receives the display information transmitted from the external storage system 90. In step S113, the data exchange unit 11 of the service providing system 10 transmits the display information transmitted from the external storage system 90 to the image processing apparatus 80. Accordingly, the data exchange unit 81 of the image processing apparatus 80 receives the display information transmitted from the service providing system 10.

In step S114, in response to an input operation by the service user on the distribution destination input field 953 of the application execution screen 950 displayed in step S109, the reception unit 82 of the image processing apparatus 80 receives a selection of a folder. In step S115, in response to various input operations by the service user on the application execution screen 950 and pressing of the scan button 959, the data exchange unit 81 transmits a process execution request to the service providing system 10. This process execution request includes the application ID of the application selected in step S105, a file name input to the file name input field 951, and user-specified information which is various information input to the application execution screen 950. Accordingly, the data exchange unit 11 of the service providing system 10 receives the process execution request transmitted from the image processing apparatus 80.

In step S116, the input/output service processing unit 14 of the service providing system 10 acquires processing flow information stored in the application information management DB 1001 (refer to FIG. 6). Specifically, the application management unit 141 of the input/output service processing unit 14 searches the application information management DB 1001 using the application ID received in step S115 as a search key and the processing flow information included in the application processing information associated with the same application ID as the received application ID is read and acquired through the storing and reading unit 19. In step S117, the logic processing unit 144 of the input/output service processing unit 14 analyzes processing content using the processing flow information acquired in step S116.

In step S118, the external system cooperation unit 15 of the service providing system 10 transmits a distribution execution request to the external storage system 90. Specifically, the file processing unit 151 of the external system cooperation unit 15 uses, for example, the common I/F 151a to transmit a delivery execution request including the file received in step S115 and the destination folder indicating the delivery destination folder to the external storage system 90. Accordingly, the communication unit 91 of the external storage system 90 receives the distribution execution request transmitted from the service providing system 10. Then, the service processing unit 92 of the external storage system 90 executes the process corresponding to the received delivery execution request.

In step S119, the communication unit 91 of the external storage system 90 transmits a completion notice indicating that the process corresponding to the delivery execution request received in step S118 is completed to the service providing system 10. Accordingly, the file processing unit 151 of the service providing system 10 receives the completion notice transmitted from the external storage system 90. In step S120, the data exchange unit 11 of the service providing system 10 transmits the completion notice transmitted from the external storage system 90 to the image processing apparatus 80. Accordingly, the data exchange unit 81 of the image processing apparatus 80 receives the completion notice transmitted from the service providing system 10.

As described above, the image processing apparatus 80 uses the service provided by the service providing system 10 by using the application included in the service providing system 10.

As described above, when the information processing system 1 releases a new function that improves the existing function of the application included in the service providing system 10, the setting items of the existing function are not displayed on the setting screen 700 of the application developer so that the setting items cannot be used. On the other hand, the information processing system 1 displays the setting items of the existing function on the setting screen 700 of the application using the existing function set to non-display and allows existing functions to continue to be used and monitor the target application until the existing functions are no longer used. Then, when the existing function is no longer used, the information processing system 1 switches the setting item of the existing function to non-display even in the target application.

As a result, the information processing system 1 can make the existing function available in the existing application and prevent the existing function from being used in the newly created application. Further, in the information processing system 1, even when the system developer releases a new function other than the existing function in order to improve the existing function, it is possible to prevent the number of similar functions from increasing, and also to provide a setting screen 700 that is easy for application developer to use.

Various tables of the embodiments described above may be generated by learning effect of machine learning, and by classifying the data of each related item by machine learning, the tables may not be used. Here, the machine learning is a technology for making a computer acquire learning ability like a human being and the computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of these learning.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A service providing system comprising:
circuitry configured to:
store in one or more memories, application settings information indicating settings of one or more setting items for each application;
set a setting item to be displayed on a setting screen for setting application to non-display;
determine whether the setting item set to non-display is included in the one or more setting items of the application settings information; and
in response to determination that the setting item set to non-display is included in the one or more setting items of the application settings information, switch a display setting of the setting item from non-display to display, to cause the setting item to be displayed on the setting screen so as to allow the setting item to be used.

2. The service providing system of claim 1, wherein the circuitry is configured to:
receive a display request for displaying a specific setting screen for setting a specific application transmitted from a first communication terminal; and
when the setting item set to non-display is included in the one or more settings items of specific application settings information indicating the settings of the specific application, switch a display setting of the setting item from non-display to display, to cause the setting item to be displayed on the specific setting screen.

3. The service providing system of claim 2, wherein the circuitry is further configured to:
receive a non-display set request for setting a specific setting item sent from a second communication terminal; and
set the specific setting item to non-display in response to the non-display set request.

4. The service providing system of claim 1, wherein the circuitry is further configured to:
store in one or more memories, information on the setting item set to non-display;
monitor an application that uses the setting item set to non-display; and
when there is no application that uses the setting item set to non-display, display the setting screen that does not include the setting item set to non-display.

5. The service providing system of claim 4, wherein the circuitry is further configured to delete the application that does not use the setting item set to non-display from the application to be monitored.

6. The service providing system of claim 4, wherein when there is no application that uses the setting item set to non-display, the circuitry is further configured to transmit to a requester of non-display setting, a non-display notice indicating that the setting item is not to be displayed.

7. An information processing system comprising:
the service providing system of claim 1; and
a first communication terminal configured to display the setting screen, the circuitry of the service providing system is further configured to transmit setting screen information indicating the display setting switched from non-display to display to the first communication terminal, and
the first communication terminal comprising circuitry configured to display on a display, the setting screen according to the setting screen information transmitted from the service providing system.

8. The information processing system of claim 7, further comprising a second communication terminal configured to request to set a specific setting item to non-display, the second communication terminal comprising circuitry configured to:
display on a display, a non-display request screen including a plurality of setting items of the application; and
transmit to the service providing system, a non-display set request for setting a specific setting item selected from the plurality of setting items in the non-display request screen.

9. A display control method comprising:
storing in one or more memories, application settings information indicating settings of one or more setting items for each application;
setting a setting item displayed on a setting screen for setting application to non-display;
determining whether the setting item set to non-display is included in the one or more setting items of the application settings information; and
in response to determination that the setting item set to non-display is included in the one or more setting items of the application settings information, switching a display setting of the setting item from non-display to display, to cause the setting item to be displayed on the setting screen so as to allow the setting item to be used.

10. A non-transitory recording medium which, when executed by one or more processors, causes the processors to perform a display control method comprising:
storing in one or more memories, application settings information indicating settings of one or more setting items for each application;
setting a setting item displayed on a setting screen for setting application to non-display;
determining whether the setting item set to non-display is included in the one or more setting items of the application settings information; and
in response to determination that the setting item set to non-display is included in the one or more setting items of the application settings information, switching a display setting of the setting item from non-display to display, to cause the setting item to be displayed on the setting screen so as to allow the setting item to be used.

* * * * *